US008881629B2

(12) United States Patent
Pennington

(10) Patent No.: US 8,881,629 B2
(45) Date of Patent: Nov. 11, 2014

(54) CONTINUOUS MOTION DE-FLASH TRIMMING MACHINE

(75) Inventor: Garrett R. Pennington, Manheim, PA (US)

(73) Assignee: Graham Packaging Company, L.P., York, PA (US)

(*) Notice: Subject to any disclaimer, the term of this patent is extended or adjusted under 35 U.S.C. 154(b) by 192 days.

(21) Appl. No.: 13/494,201

(22) Filed: Jun. 12, 2012

(65) Prior Publication Data

US 2013/0327196 A1 Dec. 12, 2013

(51) Int. Cl.
*B26D 5/20* (2006.01)
*B23D 25/02* (2006.01)
*B29C 49/00* (2006.01)

(52) U.S. Cl.
USPC ............... 83/230; 83/326; 425/527; 425/806

(58) Field of Classification Search
USPC ........... 83/19, 24, 47, 54, 112, 152, 155, 140, 83/914, 946, 326; 425/806, 525–527, 539, 425/289; 29/33 A, 33 J; 198/339.1–339; 264/150, 161, 533
See application file for complete search history.

(56) References Cited

U.S. PATENT DOCUMENTS

| | | | | |
|---|---|---|---|---|
| 1,463,314 A | * | 7/1923 | Ford | 83/22 |
| 3,122,467 A | * | 2/1964 | Hannon | 156/583.5 |
| 3,140,218 A | * | 7/1964 | Hannon | 156/583.5 |
| 3,195,288 A | * | 7/1965 | Sloan et al. | 53/140 |
| 3,300,365 A | * | 1/1967 | Roos | 156/361 |
| 4,198,886 A | * | 4/1980 | Bowers et al. | 83/112 |
| 4,332,989 A | * | 6/1982 | Nicolaisen | 200/47 |
| 4,854,108 A | * | 8/1989 | Cassoli | 53/209 |
| 5,202,135 A | * | 4/1993 | Yawn | 425/527 |
| 5,280,622 A | * | 1/1994 | Tino | 700/255 |
| 5,695,564 A | * | 12/1997 | Imahashi | 118/719 |
| 5,880,954 A | * | 3/1999 | Thomson et al. | 700/79 |
| 6,009,991 A | * | 1/2000 | Anderson | 198/349 |
| 6,235,634 B1 | * | 5/2001 | White et al. | 438/680 |
| 6,325,195 B1 | * | 12/2001 | Doherty | 192/133 |
| 6,360,414 B1 | * | 3/2002 | Maddox et al. | 29/33 A |

(Continued)

OTHER PUBLICATIONS

Autotec Engineering of Sylvania, Ohio, Concept to Completion, printed from website http://www.autotecinc.com/Plastic_Bottle.asp, Feb. 17, 2012.

*Primary Examiner* — Ghassem Alie
*Assistant Examiner* — Bharat C Patel
(74) *Attorney, Agent, or Firm* — Stradley Ronon Stevens & Young, LLP

(57) ABSTRACT

A continuous motion de-flash machine for removing flash from molded plastic articles. An in-feed section is supported by a frame and adapted to transport articles. A de-flash section is supported by the frame, receives articles from the in-feed section, and includes (a) a de-flash turret with a plurality of cam-actuated punch stations each having a punch adapted to remove flash from an article, the punch stations traveling along an oval track with a pair of long straight portions connecting two curved portions, and (b) a nest turret with a plurality of cam-actuated nest stations, the nest stations traveling along an oval track parallel to the oval track of the punch stations. An out-feed section receives an article from the de-flash section and removes the article from the machine. A method of using the machine to de-flash articles having unwanted flash is also disclosed.

20 Claims, 23 Drawing Sheets

(56) References Cited

U.S. PATENT DOCUMENTS

| | | | |
|---|---|---|---|
| 6,856,862 B1* | 2/2005 | Feltner | 700/245 |
| 7,262,403 B2* | 8/2007 | Rieger | 250/221 |
| 7,717,020 B2* | 5/2010 | Fiorani et al. | 83/13 |
| 7,752,947 B2* | 7/2010 | Fiorani et al. | 83/13 |
| 7,988,398 B2* | 8/2011 | Hofmeister et al. | 414/217 |
| 2004/0084801 A1* | 5/2004 | Floyd et al. | 264/145 |
| 2005/0127861 A1* | 6/2005 | McMillan et al. | 318/268 |
| 2006/0071361 A1* | 4/2006 | Fiorani et al. | 264/161 |
| 2008/0042314 A1* | 2/2008 | Fiorani et al. | 264/150 |
| 2010/0006082 A1* | 1/2010 | Glinski et al. | 125/16.02 |

* cited by examiner

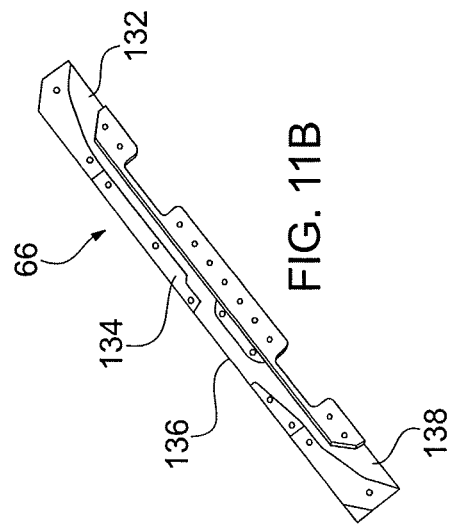
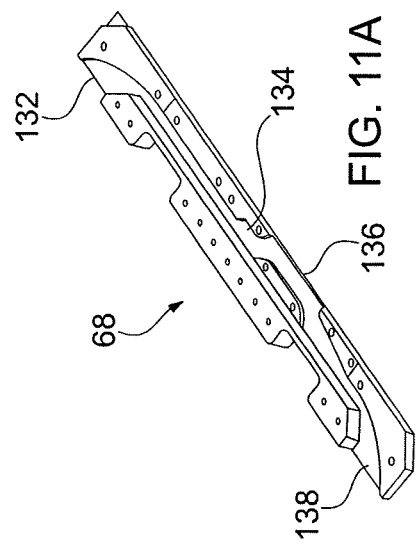

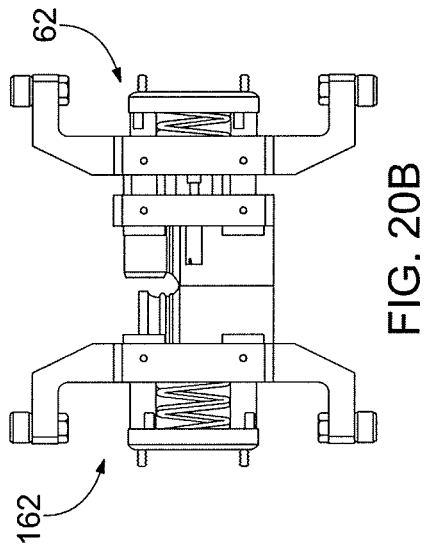
FIG. 20B
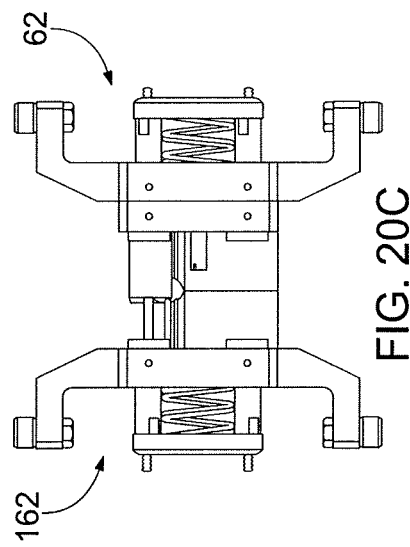
FIG. 20C
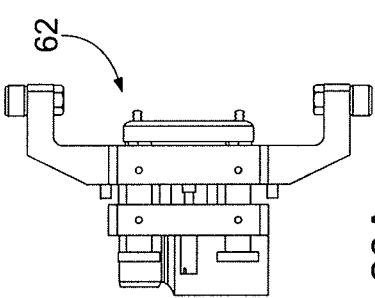
FIG. 20A
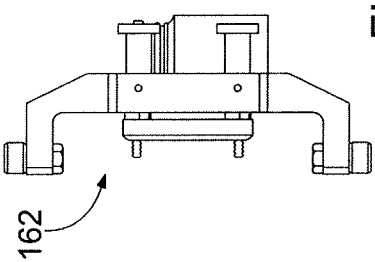

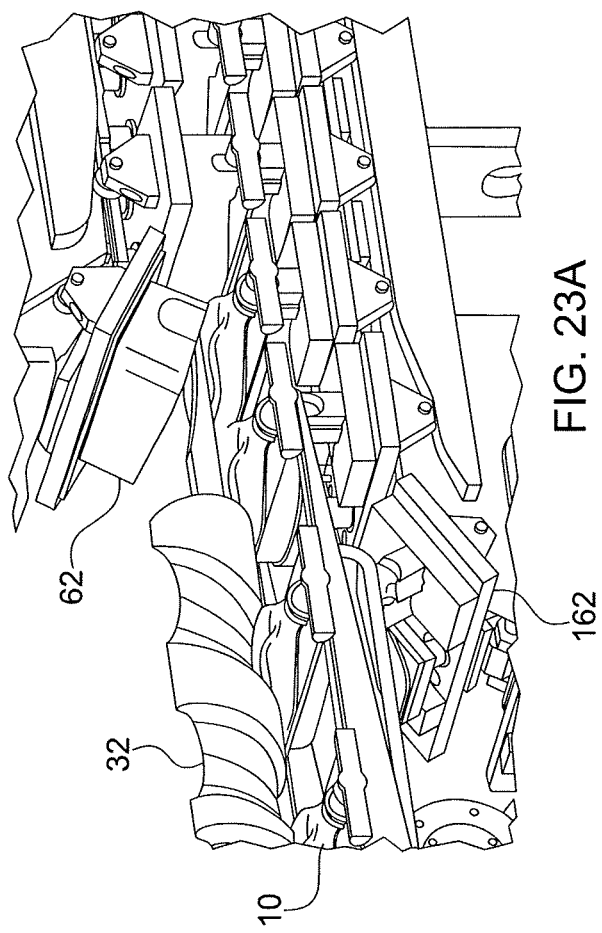

CONTINUOUS MOTION DE-FLASH TRIMMING MACHINE

TECHNICAL FIELD

The invention relates to blow molding machinery and, more particularly, to a machine for automatically and continuously removing flash from blow molded, plastic articles.

BACKGROUND OF THE INVENTION

During blow molding processes and, especially, extrusion blow molding processes, flash is often formed along a portion of a parting line of the molded plastic article. The bottom or base of the article may have a "tail" flash, for example, which is the result of clamping the plastic that is extruded between the two mold halves. In addition, unwanted plastic flash is often attached to the top of the article adjacent to where the threads of the article are formed. If the article has a handle, the section between the handle and the body of the article may also contain a web of plastic material corresponding in thickness to two layers of the original plastic parison.

There have been a number of different approaches taken to address the problem of removing flash from blow molded plastic articles. Conventional de-flash apparatus on the market operate in an indexing motion. A bottle is brought into the apparatus, the bottle is stopped, the bottle neck is held stationary between two dies while a cutting blade de-flashes the bottle, and then the bottle is removed from the apparatus. The apparatus then indexes and repeats the process for the next bottle. Starting and stopping the motion of a bottle causes efficiency issues with the production line and also reduces line throughput. Indexing machines typically cannot index more that 30-35 indexes per minute. This means that each index must de-flash many bottles at once in order to reach production line rates. Tooling is also expensive for this type of apparatus because it typically uses a long chain with bottle-specific nests to transport the bottles between stations.

Autotec Engineering of Sylvania, Ohio, provides a conventional indexing de-flash trimming apparatus. See www.autotecinc.com. Bottles arrive at the apparatus laying down. The bottles are loaded into a basket by a robot, and are transported to the apparatus via indexing. A punch closes on the bottle and removes (knocks off) the flash. The apparatus then indexes. The Autotec apparatus is limited to about 140 bottles per minute; thus, the index system is time limiting.

Other de-flash apparatus trim bottles as the bottles move continuously along a path, thereby increasing the production rate. As described in U.S. Pat. No. 6,360,414, Uniloy Milacron Inc. of Manchester, Mich., offers a continuous motion rotary de-flashing apparatus. The de-flashing apparatus is a dual rotary trimmer having two, balanced, continuously counter-rotating wheels, namely a nest tool wheel and an intermeshing trim tool wheel. Each wheel rotates along a circular path. When the two circular paths tangentially correspond, the two wheels mesh. A screw advances the articles sequentially into engagement with the trimmer whereby the articles are de-flashed of the tail, body, and top flash when the nest tool is in juxtaposed position with the trim tool. As a result, states the '414 patent, the article is nested, trimmed, and released in one continuous motion.

One issue with the continuous apparatus disclosed by the '414 patent is that the tooling only makes contact for a fraction of a second when the two wheels meet. This configuration limits the amount of flash material that can be removed. Further, some flash can be difficult to trim because the tooling meshes like gears. The apparatus is likely to experience problems with stretching, for example, rather than cleanly shearing more ductile plastic materials. Still further, the sliding movement of the trim tool adds radial shear force to the tangential shear force and risks less-than-clean shearing of flash from certain containers—especially those containers made of more ductile plastic materials.

U.S. Pat. No. 7,752,947 issued to Fiorani et al. discloses a bottle trimmer and method of cutting or trimming a plastic log ejected from a blow mold to form multiple open-mouthed bottles. The log has respective bottle portions on opposite ends of the log with each bottle portion having an offset neck. The bottle portions are connected in neck-to-neck relationship by a neck ring having a central neck axis. The trimmer and method are especially suitable for high-output production lines. A log conveyor is continuously moved along an arcuate path (reference number 320 in FIG. 27 of the '947 patent). Flash is removed by a punch engaging the log while the log is carried on a wheel rotating in a circular portion of the actuate path. The circular path of the de-flash operation disclosed by the '947 patent limits significantly the amount of time available for that operation. After de-flashing, the body to be trimmed is placed between holders carried by the conveyor and trimmed by rotating the holders about the offset neck axis as the conveyor moves past a stationary trim knife extending along the path.

Each of the known continuous apparatus are relatively expansive, complicated, costly, and heavy in weight. The de-flashing operations are completed using arcuate, often circular, paths which limit the time available for the operation. Such paths also detract from the directed, tangential force that maximizes the efficiency and effectiveness of the de-flashing cut or trim.

To overcome the shortcomings of conventional apparatus, a continuous motion de-flash trimming machine is provided. The machine picks up a bottle, removes the flash from the bottle, discards the unwanted flash, and releases the de-flashed bottle in one continuous motion. An object of the machine is to perform the de-flashing operation continuously, rapidly, and reliably to maximize throughput. A related object is to provide a machine capable of de-flashing bottles at a rate equal to the rate at which the blow molding equipment produces the bottles. A further related object is that the machine provide a relatively long, straight path for the de-flashing operation and avoid the arcuate, often circular, paths that limit conventional apparatus.

The de-flash trimming machine must be both compact and able to be oriented in-line with the blow molding equipment so as to minimize factory floor space. Another object of the machine is to provide the versatility needed to operate in connection with a wide variety of production lines and to accommodate various types, shapes, and sizes of bottles. A related object is to provide a machine that can accurately orient bottles before de-flashing to permit de-flashing without damage to the bottles. Yet another object is to provide an economical machine that saves money when installed in a plant or factory. It is still another object of the present invention to provide a machine that is sturdy, relatively light, easy to use, and reliable.

BRIEF SUMMARY OF THE INVENTION

To achieve these and other objects, and in view of its purposes, the present invention provides a continuous motion de-flash machine for removing flash from molded plastic articles. An in-feed section is supported by a frame and adapted to transport articles. A de-flash section is supported by the frame, receives articles from the in-feed section, and includes (a) a de-flash turret with a plurality of cam-actuated punch stations each having a punch adapted to remove flash from an article, the punch stations traveling along an oval track with a pair of long straight portions connecting two curved portions, and (b) a nest turret with a plurality of cam-actuated nest stations, the nest stations traveling along an oval track parallel to the oval track of the punch stations. An out-feed section receives an article from the de-flash section and removes the article from the machine.

The present invention also provides a method of de-flashing articles having unwanted flash. The method includes providing articles to a de-flash machine. The de-flash machine has (a) a de-flash turret with a plurality of punch stations each having a punch adapted to remove flash from an article, the punch stations traveling along an oval track with a pair of long straight portions connecting two curved portions, and (b) a nest turret with a plurality of nest stations, the nest stations traveling along an oval track parallel to the oval track of the punch stations. The method further includes pulling a punch station and a corresponding nest station into their open positions. An article is delivered to the punch station and the nest station while the punch station and the nest station are in their open positions. The punch station and the nest station are closed together, wherein the nest station aligns with the punch station along the straight portion of the parallel oval tracks along which the nest station and the punch station travel, thereby capturing the article. The punch is directed across the article to remove the flash from the article. The punch is retracted into the punch station. The punch station and the nest station are moved away from each other into an open position. The de-flashed article is released from the machine.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 11A illustrates the lower cam of the de-flash turret of the machine;

FIG. 11B illustrates the upper cam of the de-flash turret of the machine;

FIGS. 20A, 20B, 20C, 20D, and 20E illustrate the various steps in an exemplary method of de-flashing a bottle using the punch station and the nest station of an embodiment of the machine;

FIG. 23A shows the in-feed section of the machine illustrated in FIG. 22;

DETAILED DESCRIPTION OF THE INVENTION

Figure 1B:
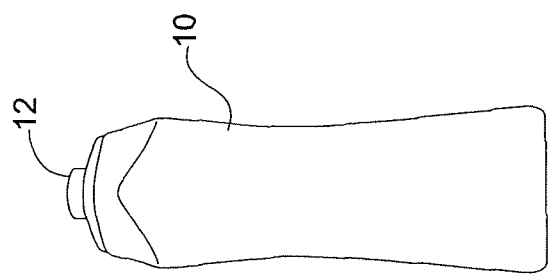
FIG. 1B illustrates the bottle shown in FIG. 1A as it is removed from the continuous motion de-flash machine according to an example embodiment of the invention (i.e., FIG. 1B is an "after" illustration)
Figure 1A:
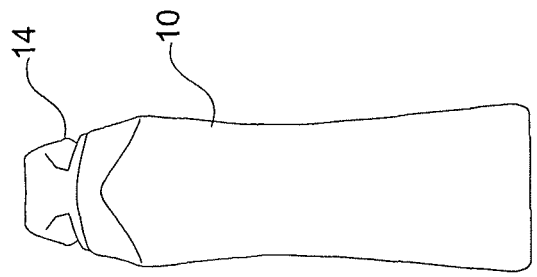
FIG. 1A illustrates a bottle as it is delivered to the continuous motion de-flash machine according to an example embodiment of the invention (i.e., FIG. 1A is a "before" illustration)

Referring now to the drawing, in which like reference numbers refer to like elements throughout the various figures that comprise the drawing, FIG. 1A shows a bottle 10 as it is delivered to the continuous motion de-flash machine 100 according to an example embodiment of the invention. The as-delivered bottle 10 has unwanted flash 14 located on the top 12 of the bottle 10. The tail flash of the bottle 10 has already been removed. After the bottle 10 passes through the machine 100, and has been processed by the steps of a method of using the machine 100, the flash 14 has been removed from the bottle 10. The de-flashed bottle 10 is shown in FIG. 1B. Although the term "bottle" is used to describe the article from which the machine 100 removes flash 14, the article may more broadly be a can, container (e.g., a milk container), case, toy, drum, tank, crate, bag, box, decorative trim object, and many other types of articles.

Figure 2:
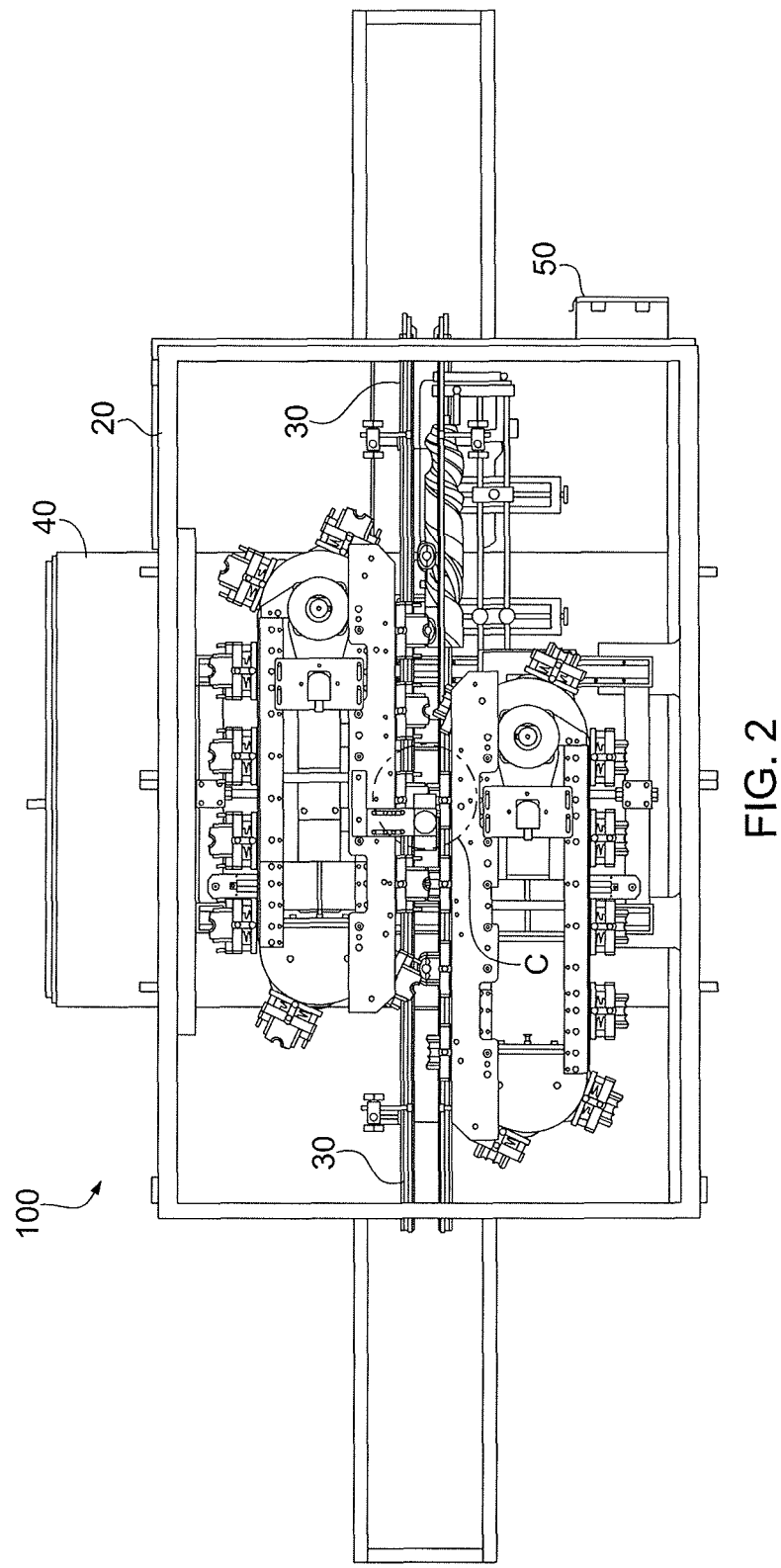
FIG. 2 is a top schematic view of the machine according to an example embodiment of the invention.
Figure 3:
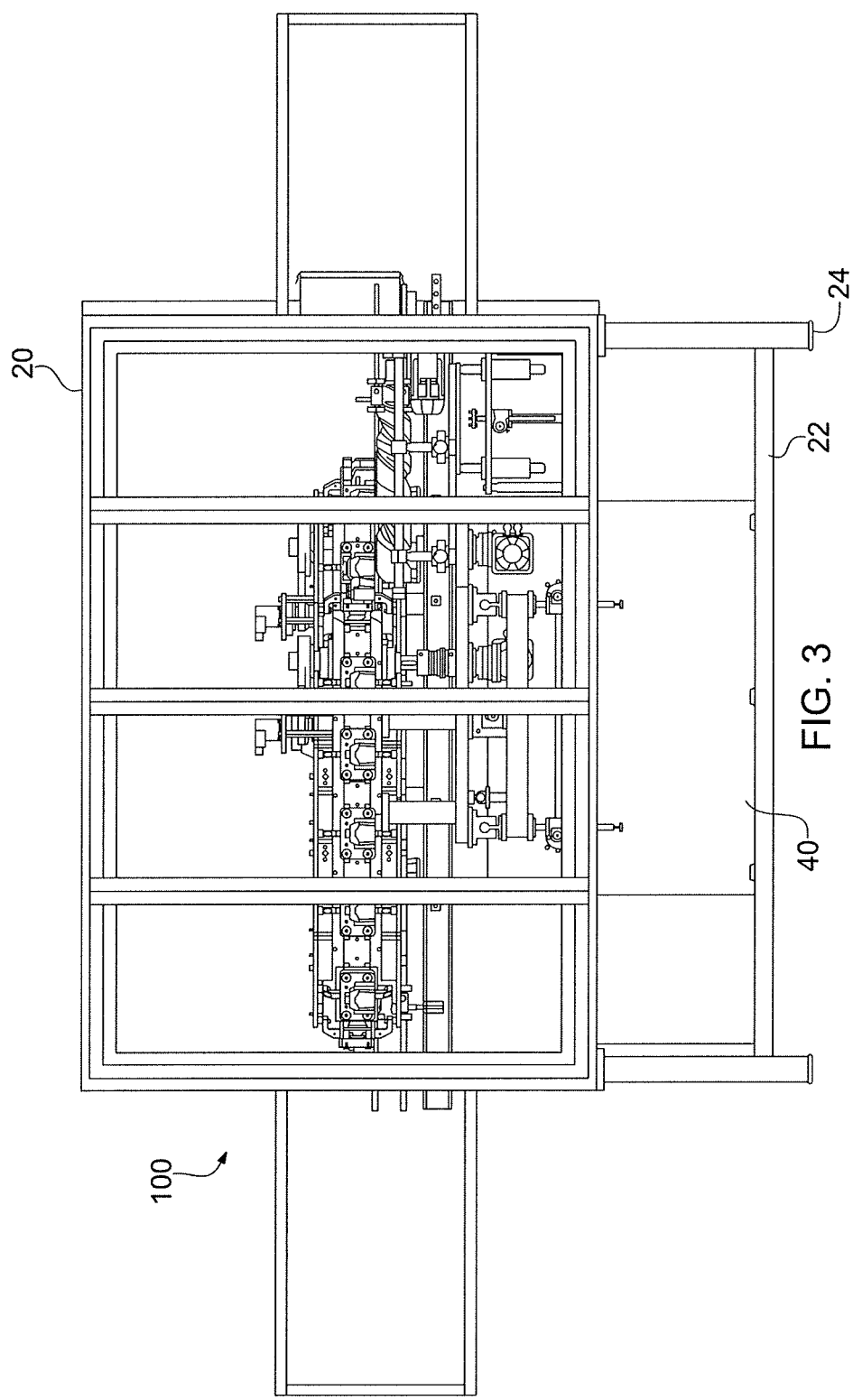
FIG. 3 is a front schematic view of the machine shown in FIG. 2.
Figure 4:
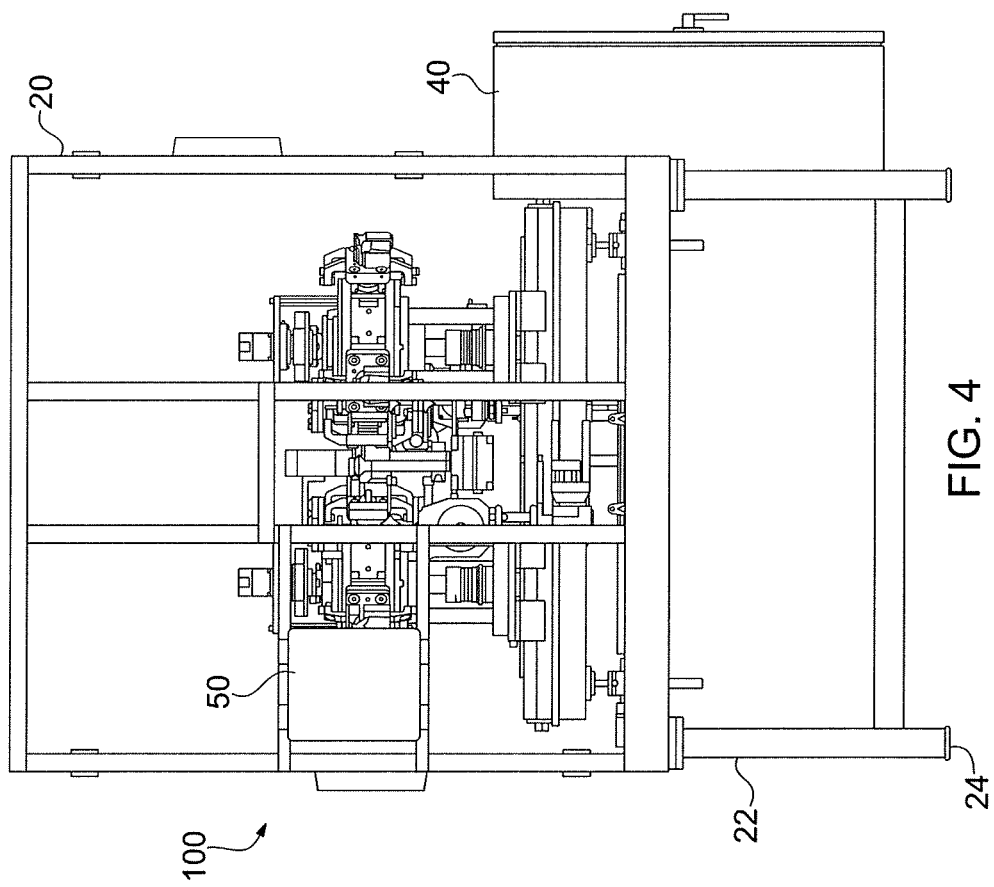
FIG. 4 is a side view schematic view of the machine shown in FIGS. 2 and 3.

FIG. 2 is a top schematic view, FIG. 3 is a front schematic view, and FIG. 4 is a side view schematic view of the machine 100. The machine 100 consists of three main sections: an in-feed section including an in-feed screw 32 and related components; a de-flash section (highlighted by the centrally located and dashed circle "C" in FIG. 2); and an out-feed section including a conveyor 30 and related components. The machine 100 operates in a continuous motion by bringing bottles 10 into the machine 100 via the in-feed screw, handing each bottle 10 from the in-screw to a cam-actuated de-flash station where the flash 14 is removed from the bottle 10, and releasing the bottle 10 back onto the conveyor at the out-feed station.

The machine 100 includes various electrical, hydraulic, and air connections. An electrical cabinet 40 houses the connections to an external source of electrical power and controls those connections. A human-machine interface or HMI 50 (also called an operator control panel) provides the operator interface between the machine 100 and the human being operating the machine 100. The HMI 50 provides a graphics-based visualization of the industrial control and monitoring system that comprises the machine 100.

Obviously, as with all machines, especially those designed to have human interaction, safety is a primary consideration. There are two emergency stop locations: on the HMI 50 and on the electrical cabinet 40. When an emergency stop is pressed, the power to all motors and compressed air valves within the machine 100 is stopped. Power to the HMI 50 will still be maintained but functionality of the machine 100 will not work until the emergency button is released and the alarm screen is cleared.

Moreover, the machine 100 has a complete system of guards 20 surrounding the machine 100. The guards 20 completely enclose the perimeter of the machine 100 and extend from the floor to a height sufficient to prevent an operator who is standing on the floor from accessing the various components of the machine 100. The guards 20 are preferably transparent, allowing the operator to view the operation of the machine 100, and include a plurality of doors that, when the machine 100 is stopped and one or more of the doors are opened, provide access to the various components of the machine 100 by the operator. The machine 100 is designed to operate only if all interlocked guards 20 are in place (unless such safety protection is purposely defeated). All guards 20 must be in place and properly secured prior to operation of the machine 100.

There are a plurality (e.g., four) of door switches mounted on the machine 100. During operation of the machine 100, these switches will monitor the doors that provide access to the machine 100. If the doors are opened during operation, the machine 100 will stop. Power to the servo motors and air pressure airlines within the machine 100 will be released.

The proper method for stopping the machine 100 during normal operation is for the operator to press a "stop" button located on a panel of the electrical cabinet 40. Once the "stop" button is depressed, the machine 100 comes to a controlled stop. The bottle in-feed gates will close and the machine 100 will continue to run until all bottles 10 within the machine 100 have exited the stations.

Utilities are typically associated with the machine 100 to deliver electric power, hydraulic fluid, compressed air, and other items to the machine 100. As would be known to an artisan, at least one power connection and one air connection are required with quick installation to the components of the machine 100 assured via quick disconnects. Similarly, plug-type connections are provided along the power, hydraulic (if used), and air lines at the junctions between the utilities and the machine 100, as needed, to allow easy connection and quick separation between these utilities and the machine 100.

The electrical requirements for the machine 100 are relatively modest: a 40 ampere main circuit breaker and voltage of 480 volts AC, 60 Hz, and 3 Phase. Power to the machine 100 can be disconnected using a "main disconnect" located on the electrical cabinet 40. The air requirements for the machine 100 are also relatively modest. The general line delivery pressure should be a minimum of 80 psig (clean air) at 5 standard cubic feet per minute, or 1 KPa at 0.14 $m^3$/minute, for adequate operation. Air pressure within the machine 100 can be released by activating a lockable safety-air-exhaust gate valve. The valve can be located on the air lines of the machine 100 in any suitable location providing easy access to the operator. The air will be exhausted from the machine 100 when the activation arm of the valve is in the down position. Air supply is used on various components of the machine 100, such as the carriage slides, the out-feed bottle blow-off, the in-feed gate, and the scrap removal system (if applicable).

As shown in FIGS. 3 and 4, the machine 100 is mounted on a frame 22. Specifically, for example, the guards 20 are bolted to the frame 22 to prevent vibration and shifting of the guards 20 relative to the frame 22. The frame 22 is designed to support the various components of the machine 100 on a floor, an elevated platform, or other flat surface. The machine 100 has a plurality of leveling pads 24 (e.g., four) located at the base of the frame 22 of the machine 100. The operator can adjust the leveling pads 24, in a well-known manner, to level the machine 100 on the floor. Adjustment can be made by loosening a lock nut with a wrench and rotating a threaded support using the wrench. Neither the lock nut nor the threaded support are shown in the figures, but they are conventional components well known to an artisan. Once leveling is complete, the lock nut is threaded against the frame 22. Holes are provided in the leveling pads 24 for bolting to the floor.

Figure 5:
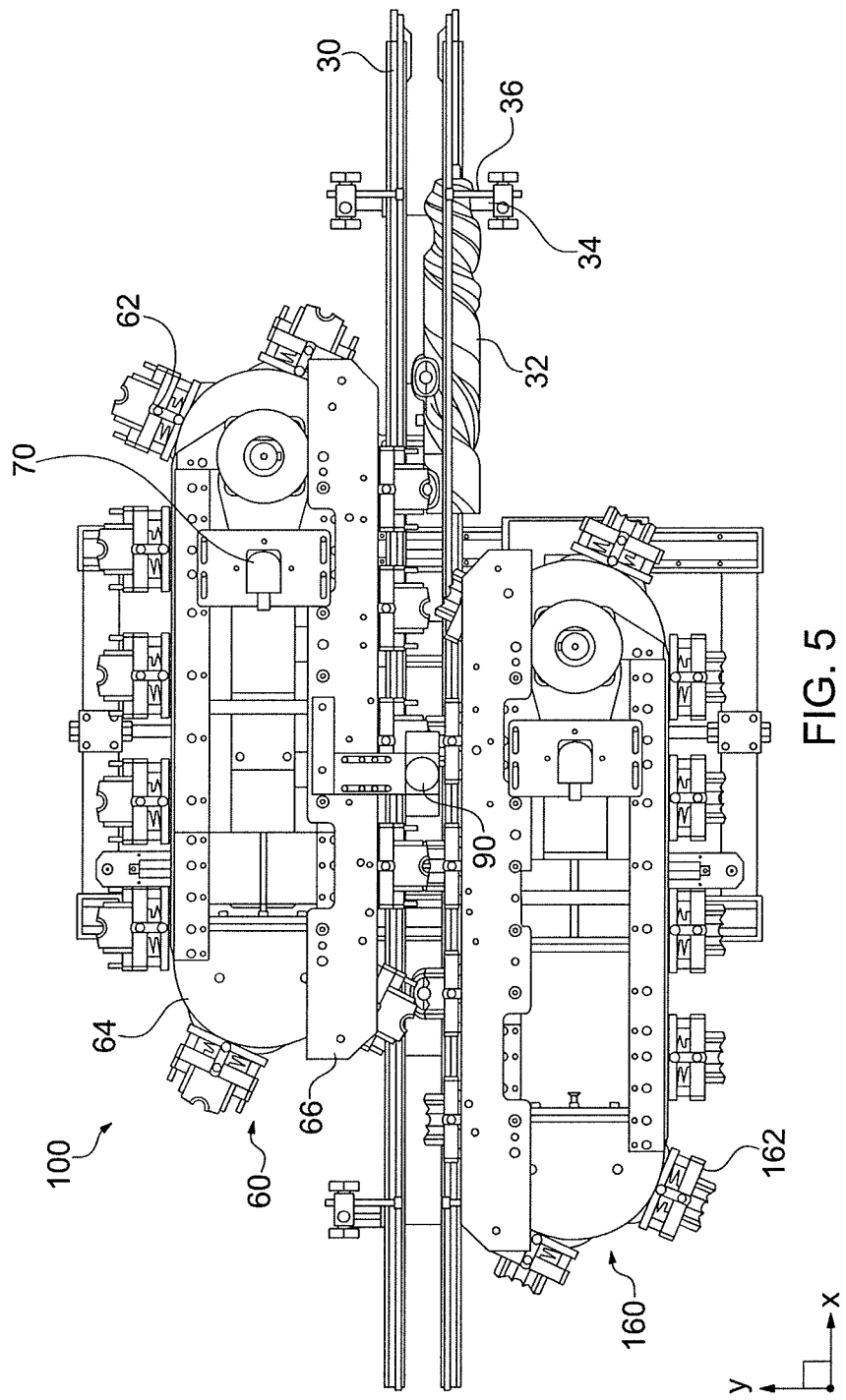
FIG. 5 is a top schematic view of the machine shown in FIGS. 2-4 with the guards and frame removed to highlight the other components of the machine.
Figure 6:
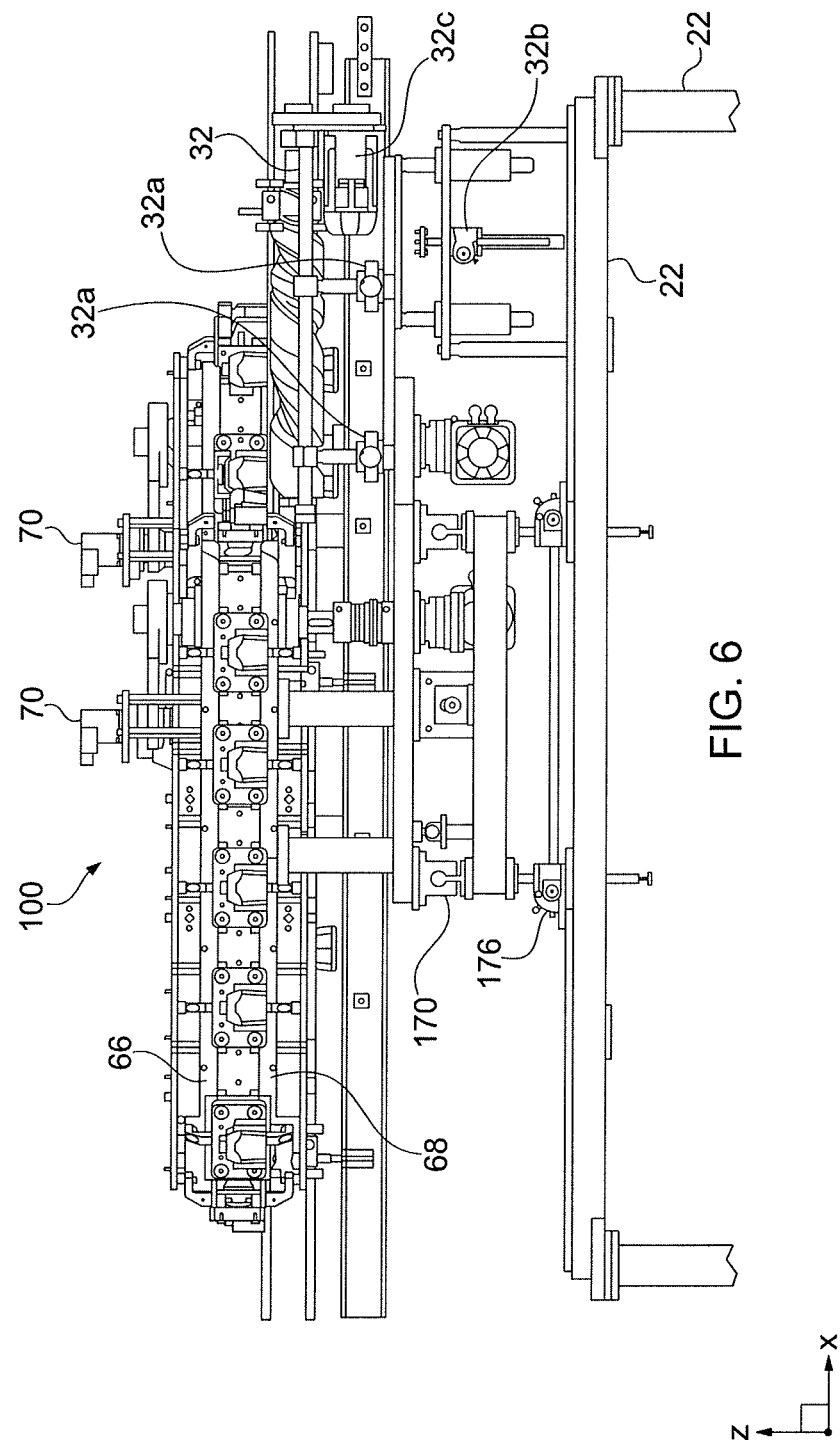
FIG. 6 is a front schematic view of the machine shown in FIGS. 2-4 with the guards removed to highlight the other components of the machine.
Figure 7:
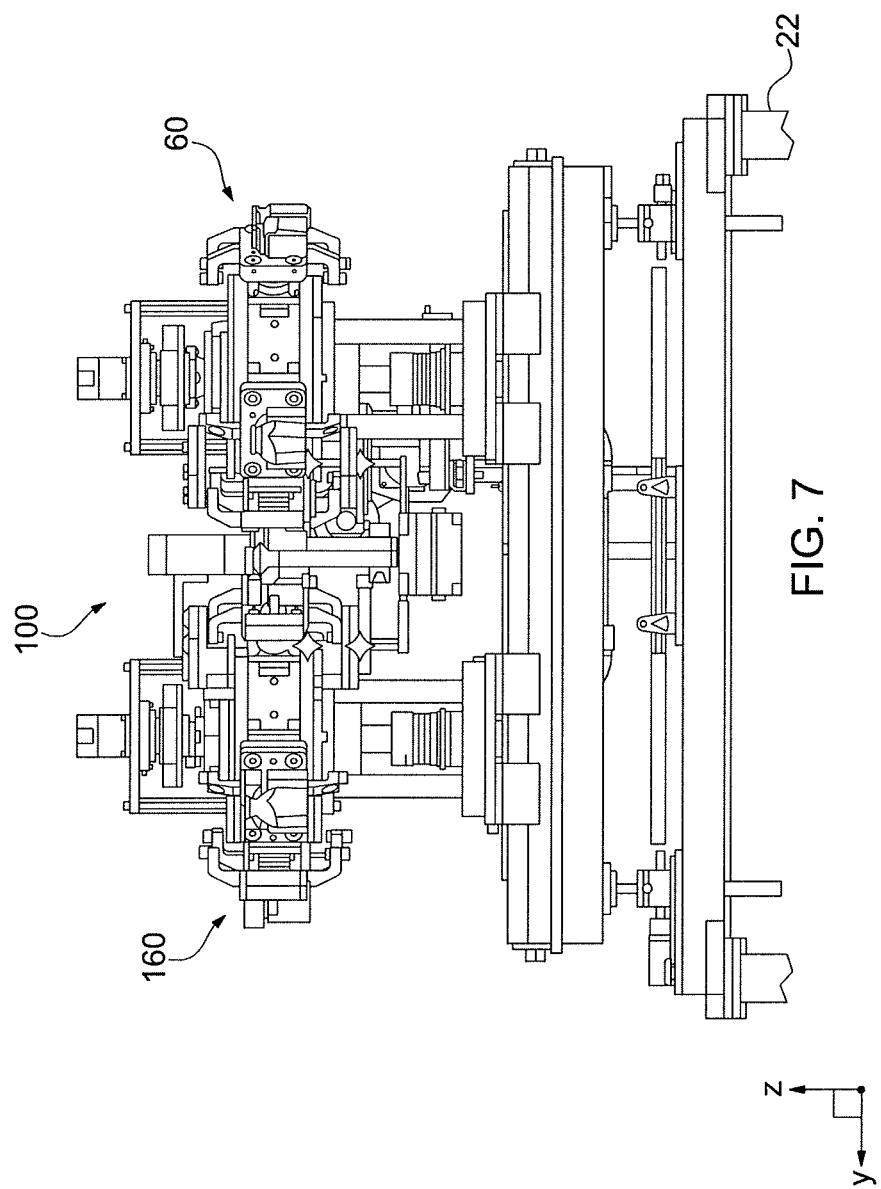
FIG. 7 is a side schematic view of the machine shown in FIGS. 2-4 with the guards removed to highlight the other components of the machine.
Figure 8:
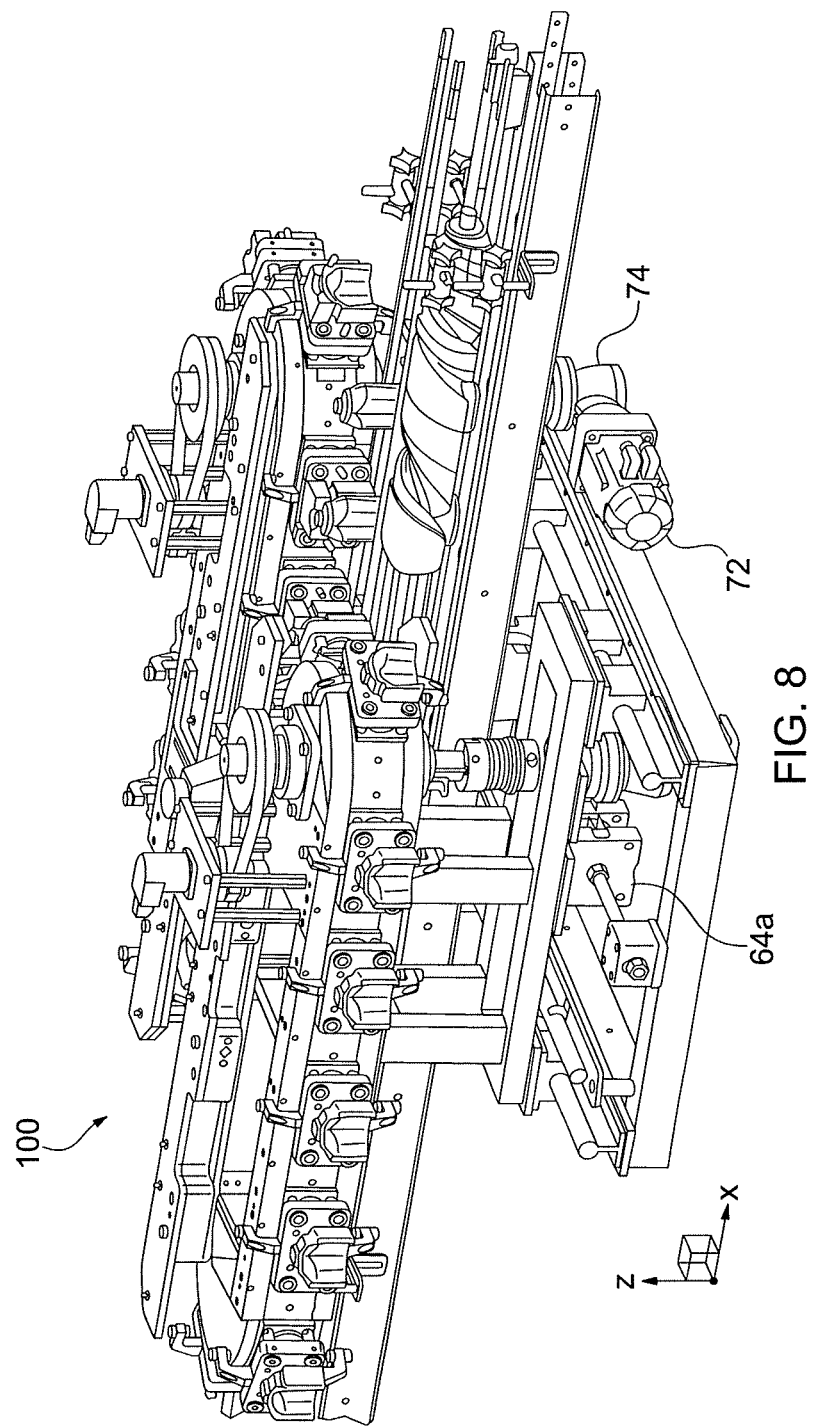
FIG. 8 is an isometric schematic view of the machine shown in FIGS. 2-4 with the guards and frame removed to highlight the other components of the machine.

FIG. 5 is a top schematic view, FIG. 6 is a front schematic view, FIG. 7 is a side schematic view, and FIG. 8 is an isometric schematic view of the machine 100. In these four figures, the guards 20 (and, for FIGS. 5 and 8, also the frame 22) have been removed to highlight the other components of the machine 100. The Cartesian rectangular coordinate system is illustrated on the bottom, left-hand corner of each of FIGS. 5-8. As is well known, three mutually perpendicular planes form the Cartesian rectangular coordinate system. The three intersections of these three planes are called the axes of coordinates and are labeled the x-axis, the y-axis, and the z-axis. Their common point is called the origin. Cartesian coordinates are used to determine each point uniquely in space through three numbers, usually called the x-coordinate, the y-coordinate, and the z-coordinate of the point.

Turning first to the in-feed section, that section includes the conveyor 30 (typically a table top conveyor), the in-feed screw 32, and corresponding drives. Bottles 10 are brought into the in-feed section (or system) by the conveyor 30 which feeds the bottles 10 into the rotating in-feed screw 32. The conveyor 30 may be included as part of the machine 100. Alternatively, the conveyor 30 may be a component separate from the machine 100.

The conveyor 30 transports the bottles 10 longitudinally and in an upright manner from a molding machine (not shown) to the in-feed screw 32. The conveyor 30 conveys bottles 10 either singly or in single-layer patterns to the in-feed screw 32. The conveyor 30 may be a belt, chain, or powered roller conveyor, and may be an endless conveyor. The conveyor 30 delivers the bottles 10 specifically and directly to the in-feed screw 32 of the machine 100. Push bars, movable stripping plates, and other conventional components typically used to transfer bottles from conveyors to machinery, although not precluded, are not necessary.

To ensure a smooth transition from the conveyor 30 to the stations of the de-flash section, a separate in-feed screw 32 is designed for each bottle shape to be accommodated by the machine 100. The in-feed screw 32 takes bottles 10 that are positioned back-to-back on the conveyor 30 and spaces the bottles 10 to the station pitch. In one typical example, the in-feed screw 32 places the bottles 10 on a 9 inch or 23 cm station pitch.

The in-feed section also includes a proximity switch 34 located on a shaft coupling 36. This proximity switch 34 allows the machine 100 to establish a home position for maintaining timing with the stations. The timing position can be set in the HMI 50. The HMI 50 also allows the operator to adjust the screw timing with a nest turret 160 as the machine 100 is running (no tools or stopping the machine 100 are required). The timing should always be reset after changing the in-feed screw 32.

As best illustrated in FIG. 6, the in-feed screw 32 can be adjusted both vertically and horizontally (if needed) to align with the other components of the machine 100. A horizontal adjustment assembly 32a allows the operator to correct the position of the in-feed screw 32 toward and away from the centerline of the conveyor 30. A vertical adjustment assembly 32b allows the operator to correct the position of the in-feed screw 32 up or down. A servo motor 32c drives the in-feed screw 32. A suitable servo motor 32c is the AKM series servo motor available from Kollmorgen of Radford, Va.

The de-flash section of the machine 100 includes two turrets, a de-flash turret 60 and a nest turret 160. Each turret 60, 160 includes a corresponding number of stations (twelve stations are illustrated in the example embodiment). Thus, the de-flash turret 60 has twelve equally spaced punch side stations 62 and the nest turret 160 has twelve equally spaced nest clamping side stations 162. For reasons that will be highlighted below, it is important that each turret 60, 160 has an oval shape, presenting a long straight section adjacent to the conveyor 30. The machine 100 therefore includes two, corresponding, oval tracks each having a pair of long straight sections connecting two curved, semi-circular sections.

The de-flash turret 60 consists of the following components: the punch station 62, a Camco precision link chain 64, an upper cam 66, a lower cam 68, an encoder 70, and a drive system including a servo motor 72 and a gearbox 74 (preferably having a 70:1 ratio). A suitable gearbox 74 is available from Wittenstein Inc. of Bartlett, Ill., as the model SPK gearbox. The Camco chain 64 transports the bottles 10 from the in-feed section to the out-feed section. The drive system rotates the Camco chain 64 at a consistent speed in a clockwise direction. As best illustrated in FIG. 8, an air cylinder 64a is provided to facilitate movement of the Camco chain 64 in and out. Mounted to the top and bottom of the Camco chain 64 are the upper cam 66 and lower cam 68, respectively. These two cams 66, 68 have identical profiles. The de-flash or punch stations 62 are mounted on every other link of the Camco chain 64.

Figure 10:
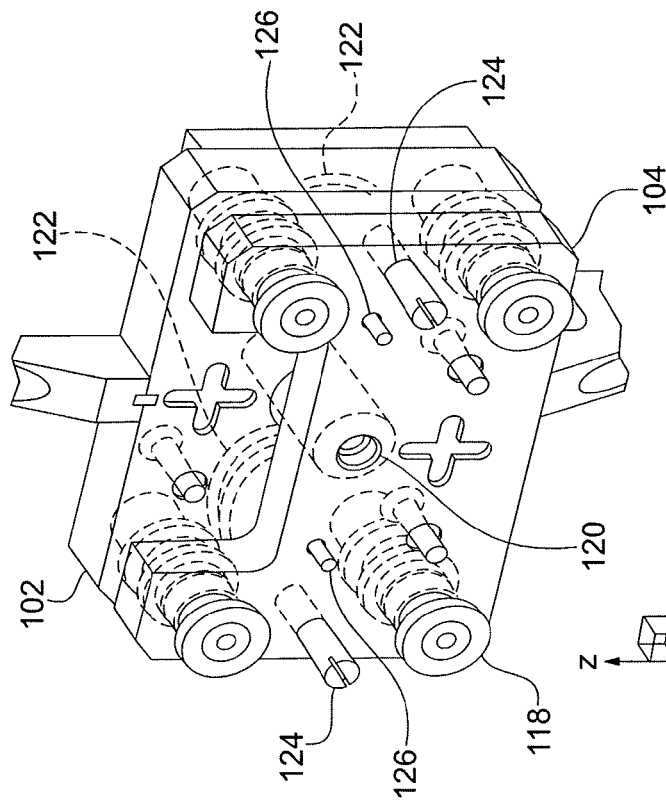
FIG. 10 is a second front perspective view of the punch station of the machine.
Figure 9:
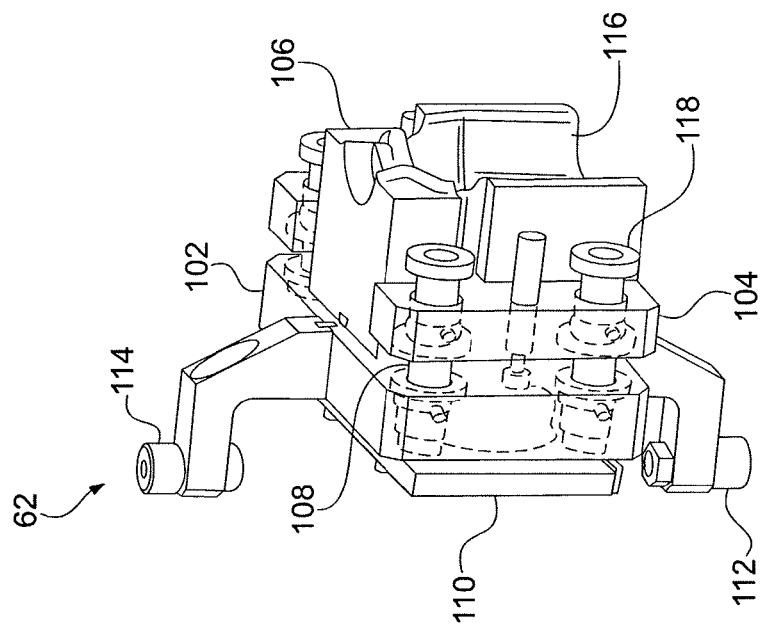
FIG. 9 is a first front perspective view of the punch station of the machine.

FIGS. 9 and 10 highlight the punch station 62 in two different front perspective views. Each punch station 62 consists of two slide plates: a back slide plate 102 and a front side plate 104. A punch 106 is mounted to the back slide plate 102 and a bottle nest 116 is mounted to the front slide plate 104. Each of the slide plates 102, 104 are attached to four linear rods 108 that allow the slide plates 102, 104 to slide laterally. These linear rods 108 are attached to a station block 110 that is mounted to the Camco chain 64. The linear rods 108 have slide stops 118 to prevent the front slide plate 104 from separating entirely from the linear rods 108. A lower cam roller 112 and an upper cam roller 114 are attached to the punch station 62 to engage the lower cam 68 and the upper cam 66, respectively, as the punch station 62 travels around the cam.

The punch station 62 has two sets of movements initiated by the cam profile. The first movement occurs when a small spring 120 pushes the bottle nest 116 forward, mating the bottle nest 116 to its corresponding nest on the nest turret 160. During the second movement, the two large springs 122 push the punch 106 forward and across the part line of the bottle 10. This cuts the flash 14 from the top 12 of the bottle 10. A pair of dampers 124 and a pair of shoulder bolts 126 are also shown in FIG. 10.

FIG. 11A illustrates the lower cam 68 of the de-flash turret 60; FIG. 11B illustrates the upper cam 66 of the de-flash turret 60. The upper cam 66 and the lower cam 68 are pinned to maintain alignment. The cam (including the upper cam 66 and the lower cam 68) consists of multiple segments made, for example, from hardened A2 tool steel. The punch station 62 enters each cam 66, 68 at an entry segment 132, the respective nests of the punch station 62 and nest station 162 mate at the nest mate segment 134. The bottle 10 is de-flashed at the de-flash segment 136. Finally, the punch station 62 exits each cam 66, 68 at an exit segment 138.

Figure 12:
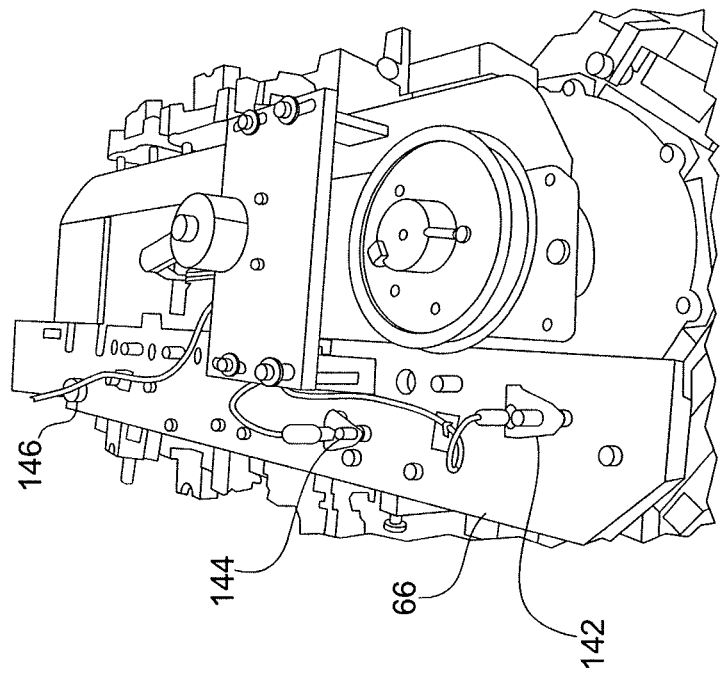
FIG. 12 illustrates the plurality of proximity switches mounted to the upper cam of the de-flash turret of the machine.

As illustrated in FIG. 12, there are a plurality (three are shown) of proximity switches mounted to the upper cam 66 of the de-flash turret 60. The first proximity switch 142 verifies that the cam is still connected to the punch station 62. The second proximity switch 144 establishes the homing position for the punch station 62. The third proximity switch 146 verifies that the cam is still connected to the punch station 62.

The nest turret 160 is similar to the de-flash turret 60 and, therefore, similar components are labeled with the same reference number. The nest turret 160 consists of the following components: the nest station 162, a Camco precision link chain 64, an upper cam 66, a lower cam 68, an encoder 70, and a drive system including a servo motor 72 and a gearbox 74 (preferably having a 70:1 ratio). The Camco chain 64 transports the bottles 10 from the in-feed section to the out-feed section. The drive system rotates the Camco chain 64 at a consistent speed in a counter-clockwise direction. Mounted to the top and bottom of the Camco chain 64 are the upper cam 66 and lower cam 68, respectively. These two cams 66, 68 have identical profiles. The nest stations 162 are mounted on every other link of the Cameo chain 64.

Figure 13:
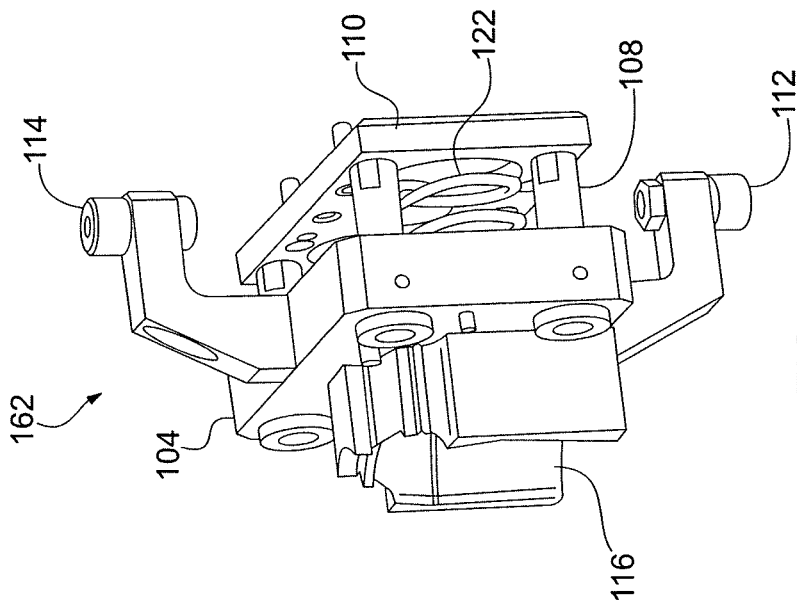
FIG. 13 is a front perspective view of the nest station of the machine.

FIG. 13 is a front perspective view of the nest station 162. Each nest station 162 includes a bottle nest 116 that is attached to a front slide plate 104. The front slide plate 104 is aligned on linear rods 108 (four are shown by way of example) so it can slide laterally. The linear rods 108 are connected to a station block 110 that is mounted to the Camco chain 64. A lower cam roller 112 and an upper cam roller 114 are attached to the nest station 162 to engage the lower cam 68 and the upper cam 66, respectively, as the nest station 162 travels around the cam.

The nest station 162 has only one movement during the cam cycle. The movement occurs when the two large springs 122 move the front slide plate 104 of the bottle nest 116 forward. Such movement mates the bottle nest 116 on the nest station 162 of the nest turret 160 to its corresponding bottle nest 116 on the punch station 62 of the de-flash turret 60.

Figure 14A:
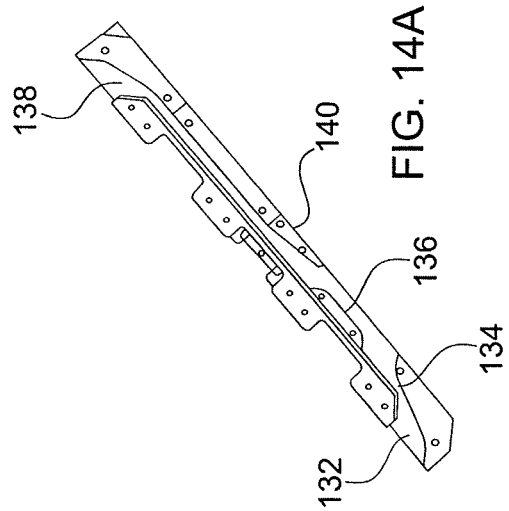
FIG. 14A illustrates the lower cam of the nest turret of the machine.
Figure 14B:
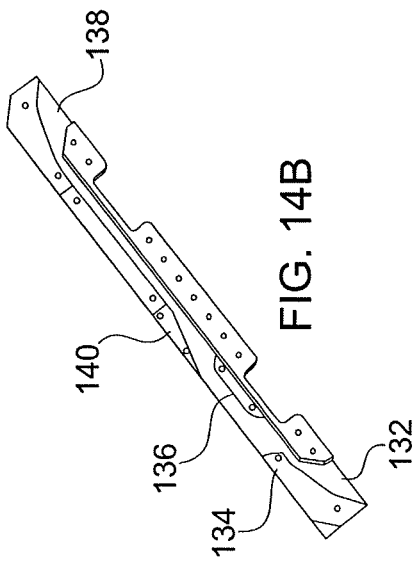
FIG. 14B illustrates the upper cam of the nest turret of the machine.

FIG. 14A illustrates the lower cam 68 of the nest turret 160; FIG. 14B illustrates the upper cam 66 of the nest turret 160. The upper cam 66 and the lower cam 68 are pinned to maintain alignment. The cam (including the upper cam 66 and the lower cam 68) consists of multiple segments made, for example, from hardened A2 tool steel. The nest station 162 (with a bottle 10) enters each cam 66, 68 at an entry segment 132. The respective nests of the punch station 62 and nest station 162 mate at the nest mate segment 134. The bottle 10 is de-flashed at the de-flash segment 136. The nest station 162 (with a bottle 10) retracts at retract segment 140. Finally, the nest station 162 (with a bottle 10) exits each cam 66, 68 at an exit segment 138.

Figure 15:
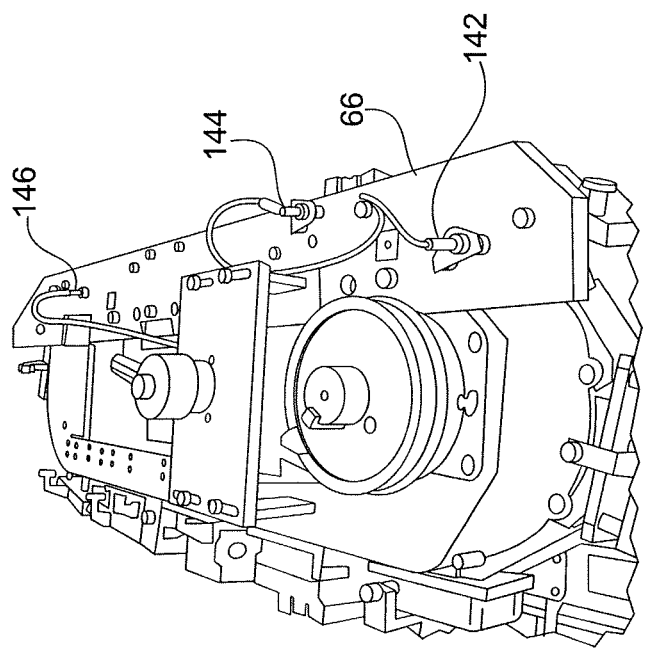
FIG. 15 illustrates the plurality of proximity switches mounted to the upper cam of the nest turret of the machine.

As illustrated in FIG. 15, there are a plurality (three are shown) of proximity switches mounted to the upper cam 66 of the nest turret 160. The first proximity switch 142 verifies that the cam is still connected to the nest station 162. The second proximity switch 144 establishes the homing position for the nest station 162. The third proximity switch 146 verifies that the cam is still connected to the nest station 162.

Figure 16:
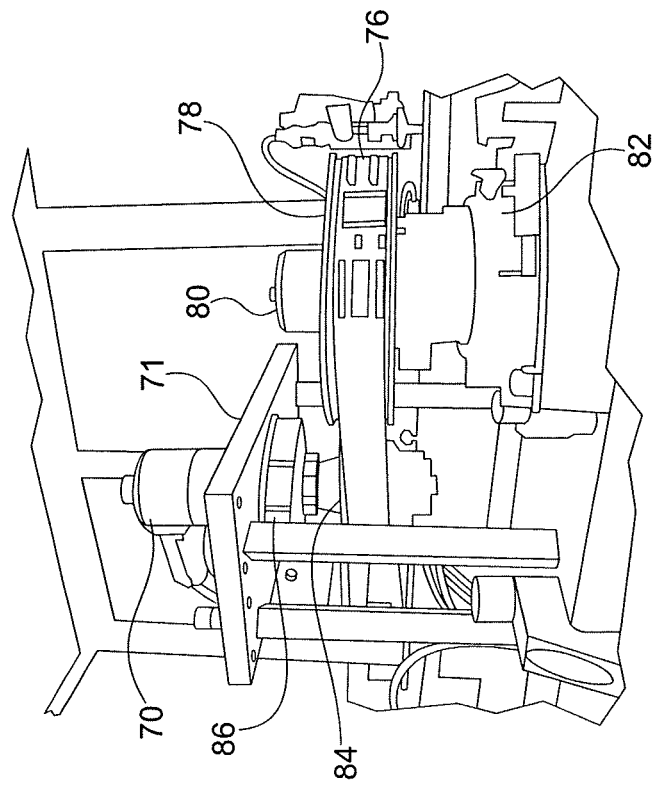
FIG. 16 illustrates the encoder that is installed on both the de-flash turret and the nest turret of the machine to monitor the speed and position of the punch stations and the nest stations.

FIG. 16 illustrates the encoder 70 that is installed on both the de-flash turret 60 and the nest turret 160 to monitor the speed and position of the punch stations 62 and the nest stations 162. During the "homing" sequence, described below, the machine 100 uses information from the encoders 70 and the proximity switches 142, 144, and 146 to determine the exact location of the punch stations 62 and the nest stations 162. This position can be adjusted by the operator by placing an offset value in the HMI 50. During operation, the encoders 70 are also used to monitor the speed and position of the two turrets 60, 162. If one turret 60, 162 is slightly out of position with respect to the other turret, 60, 162, the machine 100 will generate an alarm and stop.

The encoder 70 is mounted to an encoder mounting plate 71. The mounting plate 71 has slots to allow for replacement and tightening of an encoder belt 76. The encoder belt 76 is driven on a pulley 78 on a keyed shaft 80. A bearing 82 facilitates rotation. The encoder belt 76 travels around an encoder pulley 84; a bearing 86 facilitates rotation. The encoder 70 is geared to rotate two times for every turn of the Camco drive sprocket. This means that each station 62, 162 equals 180° of encoder rotation. The bearing 86 also supports the encoder pulley 84 to prevent damage to the unit. A spider shaft coupler connects the encoder 70 to the encoder pulley 84 and shaft (the coupler is located under the encoder 70 so it is not visible until the components are taken apart). A suitable encoder 70 is the Stegmann ATM60 encoder available from SICK, Inc. of Minneapolis, Minn.

Figure 17:
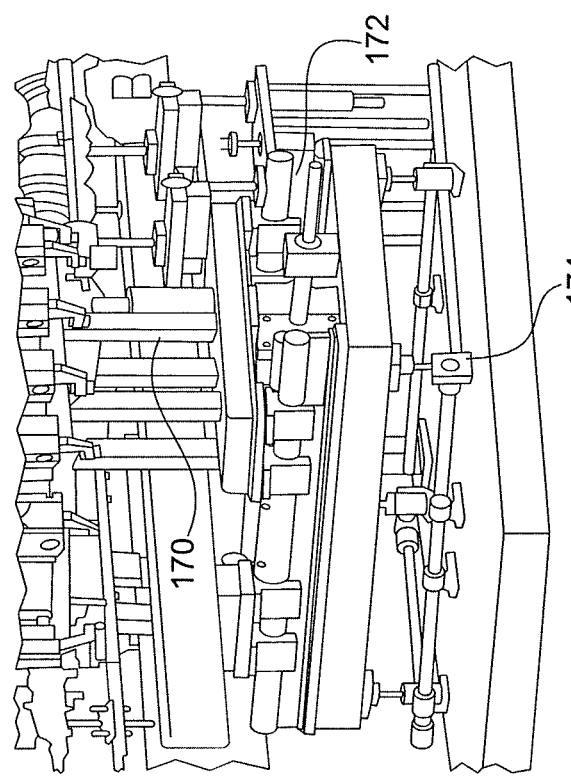
FIG. 17 is a perspective schematic view of the machine highlighting the carriage slide assembly and the jack assembly for positioning the de-flash turret and the nest turret.

As shown in FIG. 17, the machine 100 has a carriage slide assembly 172 for positioning the de-flash turret 60 and the nest turret 160. These turrets 60, 160 are mounted on supports 170 including linear bearings that rest on hardened and precision-ground rods. Movement of the carriage slide assemblies 172 is achieved using two air cylinders.

Figure 18:
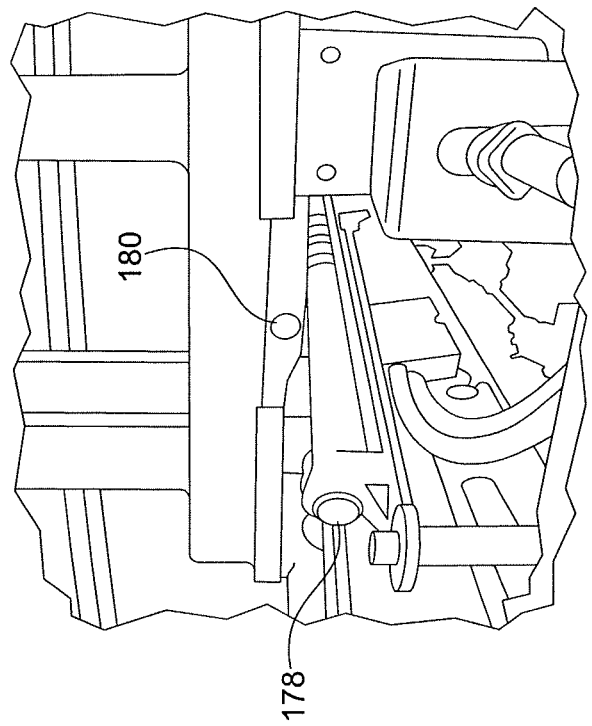
FIG. 18 is a perspective schematic view of the machine highlighting the linear variable differential transformer and the magnet used to determine if the turrets are in the "in" or "out" position.

To detect the lateral position of each turret 60, 160, and as shown in FIG. 18, a linear variable differential transformer 178 (LVDT), also called just a differential transformer or sensor, is mounted to the support 170 directly underneath each turret 60, 162. The LVDT 178 is a type of electrical transformer used for measuring linear displacement (position). A suitable LVDT 178 is available from Balluff Inc. of Florence, Ky., as the BTL6 model LVDT. Attached to the turret 60, 162 is a small magnet 180 that the LVDT 178 uses to determine if the turret 60, 162 is in the "in" or "out" position. The position of the carriage slide assembly 172 is monitored by the machine 100. If the turrets 60, 160 are out of position, the machine 100 will generate an alarm and stop. The operator inputs the position set point into the HMI 50.

The carriage slide assembly 172 is mounted to a plurality of jacks 176 (four are shown) that comprise a jack assembly 174. These jacks 176 allow the entire carriage slide assembly 172 and the turrets 60, 160 to raise and lower for adjusting the machine 100 to various bottle heights. The jacks 176 are connected to each other through a series of drive shafts and gearboxes. A hex nut adapter for adjusting the height is located on the front of the machine 100 (next to the in-feed screw 32).

Figure 19:
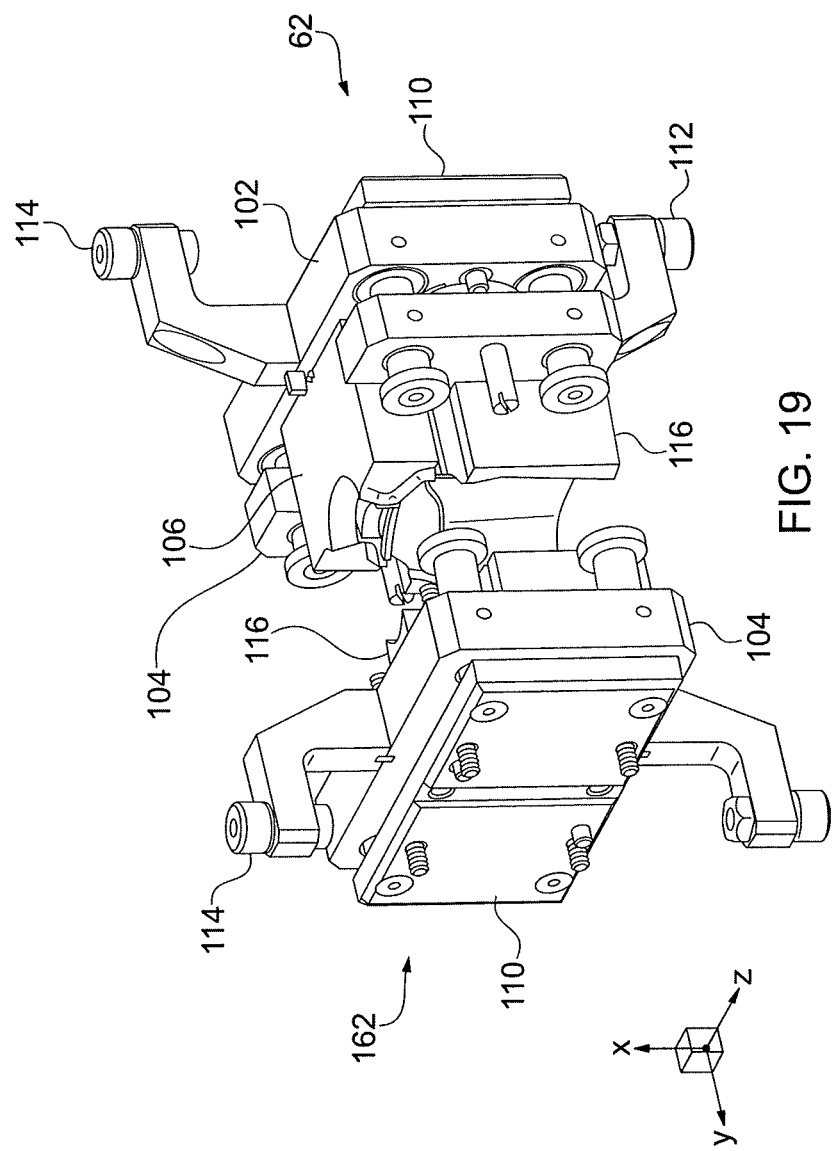
FIG. 19 illustrates the engagement between the punch station of the de-flash turret and the nest station of the nest turret.

FIG. 19 illustrates the engagement between the punch station 62 of the de-flash turret 60 and the nest station 162 of the nest station 160. The bottle 10 (not shown in FIG. 19) is captured in the bottle nest 116 of the nest station 162 so that the top 12 and the flash 14 of the bottle 10 extend above the bottle nest 116. After the nest station 162 and the punch station 62 rotate into juxtaposed engagement with each other, as shown in FIG. 19, the punch 106, having an arcuate knife edge, cuts off the flash 14 which extends beyond the top 12. The bottle 10 is held firmly between the bottle nest 116 of the nest station 162 and the bottle nest 116 of the punch station 62 during actuation of the punch 106, thereby preventing the top 12 of the bottle 10 from moving while the flash 14 is removed from the bottle 10.

The cutting edge of the punch 106 shears off the flash 14 from the bottle 10 while the bottle 10 is nested in the nest station 162 and the punch station 62 as the nest station 162 and the punch station 62 travel along the long, straight, parallel portions of their respective oval tracks for a significant period of time (unlike in other known devices, where the shearing action occurs as the nest tool and trim tool rotate past and intermesh with each other for a short period of time). During the entire de-flash operation, while the bottle 10 is in the de-flash station of the machine 100, the nest station 162 and the punch station 62 are located precisely on opposite sides of their common, long, straight, parallel portions of their respective oval tracks. As the cutting edge of the punch 106 completes its horizontal (out-and-in) path of motion perpendicular to the bottle 14, the punch 106 shears and/or pushes the flash 14 radially from the parting line on the bottle 10 toward the nest station 162. Those skilled in the art will recognize that, when the blow molded plastic material of the flash 14 is brittle, the flash 14 may be pressed or cut off by the punch 106 and pushed toward the nest station 162 quickly and easily.

One of the advantages offered by the machine 100 is its ability to remove the flash 14 even from bottles 10 made of a more ductile, less brittle, plastic such as warm polypropylene. Ductile plastic materials tend to stretch rather than to break. Conventional flash-removal processes often require additional process steps to accommodate such plastic materials during de-flashing operations. The machine 100 effectively removes the flash 14 even from bottles made of ductile plastics for at least two main reasons.

First, the time during which the machine 100 engages the bottle 10 and completes the de-flash operation (namely, the punch 106 is actuated, moves to shear the flash 14, and returns to its start position) can be made as long as desired. The parallel oval tracks of the nest station 162 and the punch station 62 allow the two stations to engage for a significantly longer period of time than for the cutting tools of conventional apparatus. Therefore, the machine 100 gives the operator the ability to define the de-flash period of time to be as long as needed to de-flash effectively.

Second, the de-flash time of the machine 100 is more effectively used than in conventional apparatus because the shearing action of the punch 106 is oriented perpendicular to the bottle 14 (rather than along an arc, as for many conventional apparatus). Thus, the shear force of the punch 106 is entirely, or almost entirely, tangential rather than radial to the bottle 10. The punch 106 travels straight across the bottle 14 and presents its sharp edge directly at the trim line between the flash 14 and the bottle 10. Thus, tolerances between the punch station 62 and the nest station 162, which are aligned along the same axis, can be made extremely tight. These tight tolerances result in a better, cleaner, higher-quality shear and reduce the likelihood that the plastic of the bottle 14 (even if ductile) will be stretched during the punch operation.

Figure 20E:
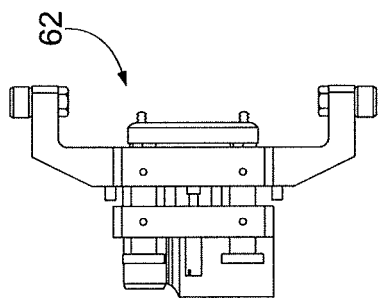

The steps of the method of de-flashing the bottle 10 using the punch station 62 and the nest station 162 of the machine 100 are illustrated using FIGS. 20A, 20B, 20C, 20D, and 20E. Initially, the bottle 10 enters the in-feed screw 32 from the conveyor 30. The in-feed screw 32 places the bottle 10 on the requisite and predetermined pitch. Referring to FIG. 20A, the cams pull the punch station 62 and the nest station 162 into their open positions (as illustrated). The in-feed screw 32 then delivers the bottle 10 to the punch station 62 and the nest station 162 while the punch station 62 and the nest station 162 are in their open positions.

The cams then cause the punch station 62 and the nest station 162 to move together into the closed position illustrated in FIG. 20B. The nest station 162 aligns with the punch station 62, in the de-flash section of the machine 100 and along the straight path of the parallel oval tracks along which the nest station 162 and the punch station 62 travel, and captures the bottle 10. More specifically, the bottle nest 116 of the punch station 62 combines with the bottle nest 116 of the nest station 162 to clamp the bottle 10 into a fixed position between the punch station 62 and the nest station 162.

Figure 20D:
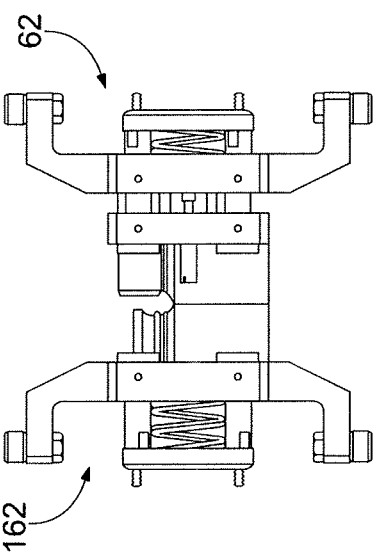

As illustrated in FIG. 20C, the cam-actuated punch station 62 moves the punch 106 across the part line of the bottle 10 to remove the flash 14 from the bottle 10. As illustrated in FIG. 20D, the cam-actuated punch station 62 retracts the punch 106 away from the nest station 162 and into the rest position of the punch 106 in the punch station 62. The cams then cause the punch station 62 and the nest station 162 to move away from each other into the open position illustrated in FIG. 20E. The bottle nest 116 of the punch station 62 and the bottle nest 116 of the nest station 162 release the bottle 10, returning the bottle 10 to the conveyor 30. The conveyor 30 then transports the bottle 10 out of the machine 100.

As illustrated in FIG. 5, the de-flash section of the machine 100 also has a removal chute 90. Preferably, the removal chute 90 operates under a vacuum to remove the de-flash scrap from the machine 100 and deliver the scrap to a suitable bin or trough 92 (see FIG. 22). Although a vacuum is preferred, the severed flash 14 may be delivered to the removal chute 90 simply by the force of gravity. Also preferably, the removed flash can be reused or recycled.

The out-feed section of the machine 100 includes the conveyor 30. After the flash 14 has been removed from the bottle 10 in the de-flash section of the machine 100, the bottle 10 is placed on the conveyor 30. The conveyor 30 then carries the bottle 10 away from the machine 100 for further processing and, ultimately, packaging. The de-flashed bottle 10 may be carried by the conveyor 30, for example, to a filling machine, to a bottle accumulation station, or to a stacker device. In one particular embodiment, the conveyor 30 may deliver the de-flashed bottle 10 to a palletizer. At the palletizer, the bottles 10 are organized into a patterned layer array suitable for stacking.

Side rails may parallel the conveyor 30, guide the bottles 10, and prevent the bottles 10 from moving transversely out of their desired orientation on the conveyor 30. The side rails cooperate with the conveyor 30 so that, as the de-flashed bottle 10 is released by the nest station 162, the bottle 10 is smoothly moved onto the conveyor 30 for support and transport of the de-flashed bottle 10. The side rails are optional, but may be useful in a particular application.

Alternatively, the de-flashed bottle 10 may be dropped downward into a basket (not shown) where the bottles 10 are accumulated, for use at a later date. The de-flashed bottle 10 also may be moved onto an out-feeder device such as a pick-and-place device (not shown). Optionally, the de-flashed bottle 10 can be held in the nest station 162 as the nest station 162 continues along its oval track to permit the bottle 10 to be moved to a differently oriented out-feeder device. As another alternative to the conveyor 30 having side rails, an out-feeder device can be provided in a manner similar to the in-feed screw 32 as previously discussed. Therefore, the out-feeder device can use one or more out-feed screws, perhaps in combination with rails.

Figure 21:
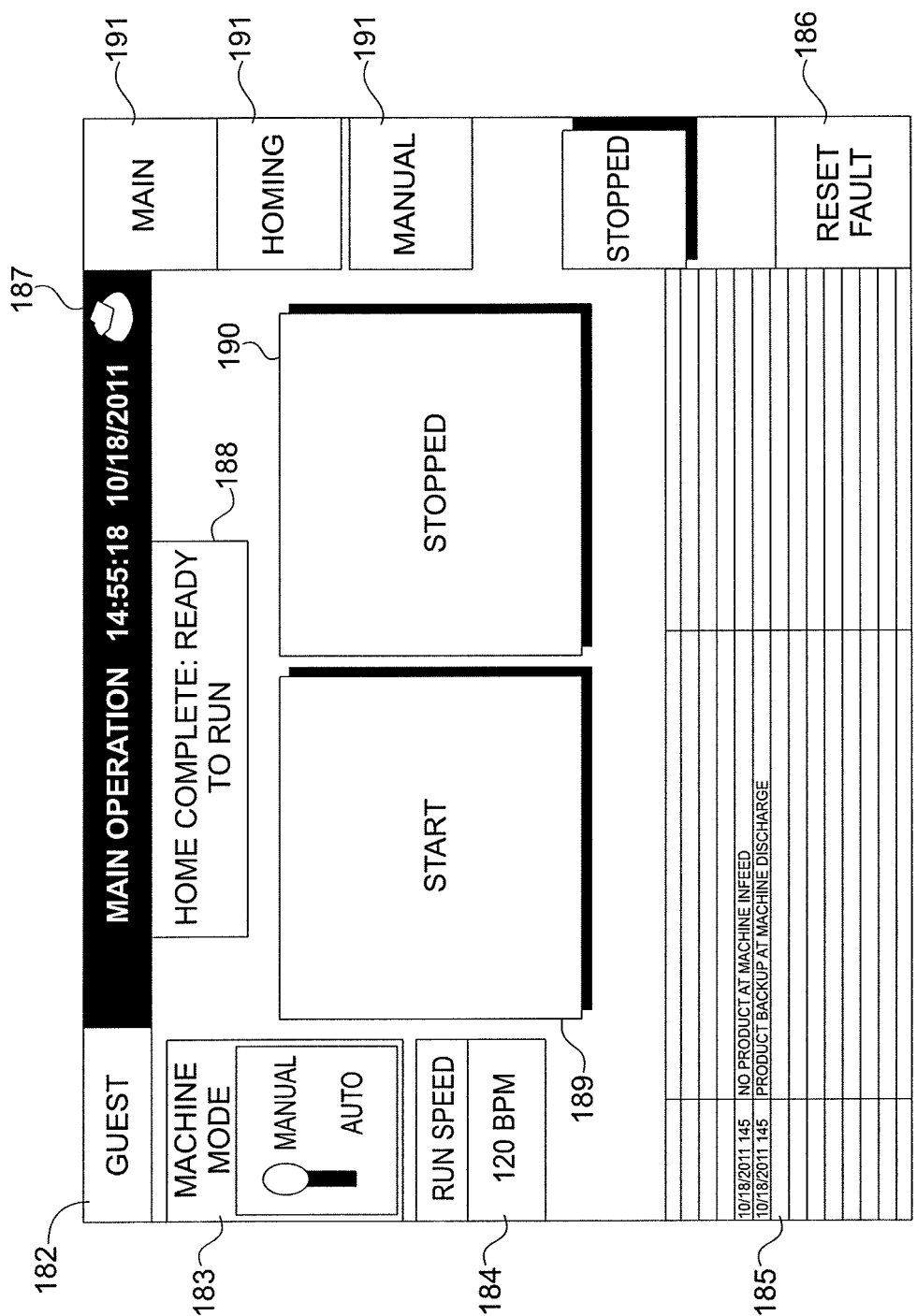
FIG. 21 illustrates one of a number of optional screens, namely a main operational screen, of the human machine interface of the machine with which an operator interacts to control and monitor the machine.

As indicated above, the operator interacts with and controls the machine 100 using the HMI 50. The HMI 50 offers the operator a number of optional screens, one of which (the main operational screen) is illustrated in FIG. 21. Each screen offers the operator a number of fields, buttons, and toolbars for review and selection. A number of example fields, buttons, and toolbars are described as follows.

The guest field 182 allows the operator to log into the machine 100 using the correct user code. The machine mode field 183 allows the operator to switch between manual and automatic operation of the machine 100 (as illustrated in FIG. 21, the machine 100 is under manual operation). The run speed field 184 changes the speed of the machine 100 in terms of bottles per minute. The fault list field 185 lists possible faults that might prevent the machine 100 from running. The reset fault field 186 allows the operator to reset the machine 100 after the operator has manually checked the listed faults. The alarm button 187 takes the operator to an alarm screen to review possible faults. The page header field 188 tells the operator what page is being viewed. The start button 189 starts the machine 100 and the stop button 190 stops the machine 100. The right toolbar 191 allows the operator to change screens (main, homing, and manual screens are illustrated as options).

The homing screen (not shown) has many of the same, but a number of different fields, buttons, and toolbars when compared to the main screen. A slide input setup field sets the zero position for the in and out position of the carriage slide assembly 172. A servo 1 chain field sets the zero position of the offset of the Camco chain 64. This allows the operator to align the punch station 62 and the nest station 162 on the de-flash turret 60 and the nest turret 160, respectively. Increments are, for example, in thousandths of an inch. Two different servo 3 in-feed screw fields set the zero position of the Camco chain 64. One of the fields is used for coarse adjustment; the other is used for fine adjustment. Together, the servo 3 in-feed screw fields allow the operator to input numbers to set the position of the in-feed screw 32. An auto home field moves all components of the machine 100 to their predetermined home positions.

Similarly, the manual operation screen (not shown) has many of the same, but a number of different fields, buttons, and toolbars when compared to the main screen. A jog speed field sets the jog speed of the components of the machine 100 currently being jogged. A servo 1 inner chain field allows the operator to jog the Camco chain 64 on the operator side of the machine 100. A servo 2 outer chain field allows the operator to jog the Camco chain 64 on the electrical cabinet side of the machine 100. A servo 3 in-feed chain field allows the operator to jog the in-feed screw 32. A jog all field allows the operator to jog all components of the machine 100 simultaneously. A servo chains in homing field moves the Camco chains 64 in and out, with red indicating that collisions are possible between the punch station 62 and the nest station 162 and green indicating that the stations 62, 162 are properly aligned. An in-feed stop button allows the operator to control whether bottles 10 enter the in-feed screw 32 or not.

Finally, the auto run modification screen (not shown) has many of the same, but a number of different fields, buttons, and toolbars when compared to the main screen. A total hours field displays the total amount of running time for the machine 100. A current run time field displays the running time for the machine 100 since the last reset. A reset time button resets the time for the current run time. A machine diagram field shows where the door or doors is or are open (displayed as a red box).

As stated above, the operator controls the machine 100 using the HMI 50. To start the machine 100, the operator typically views the homing screen and places the machine 100 into "auto mode." The operator then presses the "auto home" button so that the machine 100 automatically homes itself. Next, the operator goes to the main operation screen (FIG. 21) and engages the reset fault field 186. Finally, the operator presses the start button 189. The operator can stop the machine 100 in a variety of ways, for example by pressing the stop button 190.

The operator can run the machine 100 in the manual mode, which allows the operator to jog servo 1, servo 2, and the in-feed screw motor separately or together. The speed can also be adjusted to speed up or slow down the motors being jogged. This mode also allows the operator to open and close the gate that permits bottles 10 to enter the machine 100 and move Camco chains 64 in and out.

The operator can implement the following procedure to auto home the machine 100. First, the operator reviews the homing screen and logs into the machine 100 with a suitable user name (this step might require supervisor authorization). The operator activates the auto home field, making sure that the machine 100 is in the manual mode. The operator then reviews the manual screen, engaging the move servo chains in field. After opening the doors on the guards 20 of the machine 100, the operator uses calipers to measure the station offset (if any).

The operator then returns to the homing screen and adds the dimension measured with the calipers to the current offset. For example, if the current offset is 1 inch or 2.5 cm and the caliper reading is 2.5 inches or 6.4 cm, the new offset should be 3.5 inches or 8.9 cm. The operator inputs that offset value in the actual restart offset field for the servo 1 inner chain. The operator then presses the auto home button and awaits the green indication once the machine 100 has been homed. The operator returns to the manual mode and to the manual screen, then moves the Camco chains 64 back in. After rechecking the de-flash station 62 and the nest station 162, the operator repeats the above steps until the stations 62, 162 are aligned exactly. Finally, the operator logs out.

The machine 100 can accommodate different bottle designs and finishes when properly fitted with specific change parts. Change parts can be installed easily. For example, the in-feed screw 32 can be removed in a few steps and replaced with a different in-feed screw 32 either because the original in-feed screw needs repair or because the machine 100 must be adapted to accommodate a new bottle 10 of a different size or shape requiring a different in-feed screw 32. One or more of the de-flash stations 62 and the nest stations 162 can also be changed, as needed or desired.

The operator can also adjust the various components of the machine 100. Once the new in-feed screw 32 has been installed, for example, the operator can adjust the position of in-feed screw 32 horizontally, laterally, and vertically. The operator can also raise and lower the de-flash turret 60 and the nest turret 160. The carriage slide assembly 172 can be used to slide the turrets 60, 160 into their proper locations. In general, adjustments may be necessary to assure that each component of the machine 100 interacts properly with, and does not conflict with, the other components.

The machine 100 is relatively light in weight. In one example embodiment, the machine 100 weighs about 2,500 pounds or 1,134 kg. The length of the machine 100 is about 165 inches or 420 cm, its width is about 60 inches or 152 cm (70 inches or 180 cm including the electrical cabinet 40), and its height is about 87 inches or 221 cm.

The machine 100 offers a continuous de-flash operation. In other words, the machine 100 does not index or otherwise stop and start during operation. Thus, the machine 100 is able to de-flash bottles 10 at almost any desired speed, with the speed increased simply by lengthening the machine 100 (i.e., increasing the size of the oval tracks), without slowing production. Typical operating speeds for the machine 100 are 180 bottles per minute, but the machine 100 can operate at speeds of 240 bottles per minute or more. It takes about 1.5 seconds to de-flash an individual bottle 10.

As should be evident from the description above, the machine 100 removes flash from a bottle 10 by using cam actuated stations in a de-flash section. The machine 100 runs in continuous motion so line efficiency and speed are improved when compared to indexing systems. Such continuous motion also permits the machine 100 to obtain higher output. One of the more important features of the machine 100 is the use of two oval shaped tracks that allow the stations 62, 162 to stay in contact for a longer time period than is possible for conventional apparatus. By increasing the length of the linear section of the machine 100, the machine 100 can be run at faster speeds which means higher output.

The design of the machine 100 is flexible to accommodate all sizes of bottles 10 and desired speeds. A larger Camco chain 64 that transports the stations 62, 162 can be used for larger bottles 10. The length of the machine 100 can be increased to obtain higher output. Change parts are lower in cost when compared to conventional apparatus, in part because the machine 100 does not require large amounts of bottle nests 116 for transporting the bottles 10.

Although the bottles 10 are typically positioned in an upright position on the conveyor 30, the bottles 10 might be alternatively hung from a delivery device. As another alternative, the bottles 10 might be positioned on their sides on the conveyor 30. By positioning the bottles 10 on their sides as the machine 100 operates, bottle stability may be enhanced and removal of the scrap flash 14 may be made easier.

Figure 22:
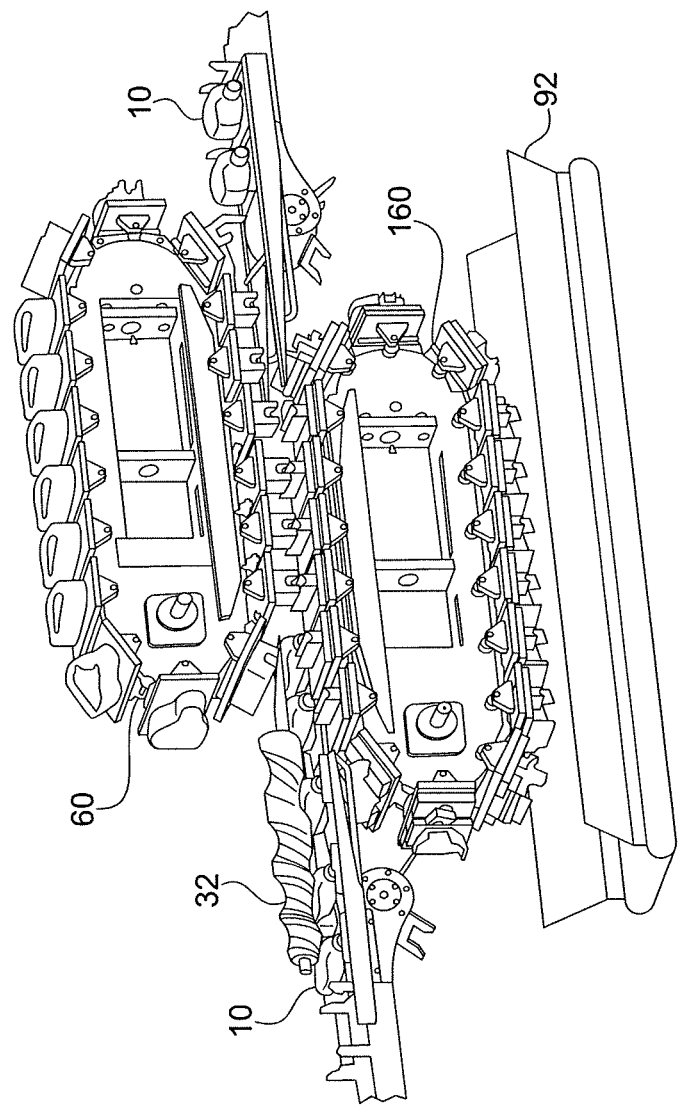
FIG. 22 is a perspective schematic view of the machine according to another example (horizontal) embodiment of the invention.

Another embodiment of the machine 100 is illustrated in FIG. 22. In this embodiment, the punch stations 62 of the de-flash turret 60 and the nest stations 162 of the nest station 160 are oriented horizontally rather than vertically. Thus, the embodiment of the machine 100 illustrated in FIG. 22 might be considered a "horizontal" machine 100 while the embodiment of the machine 100 illustrated in previous figures might be considered a "vertical" machine 100.

Figure 23B:
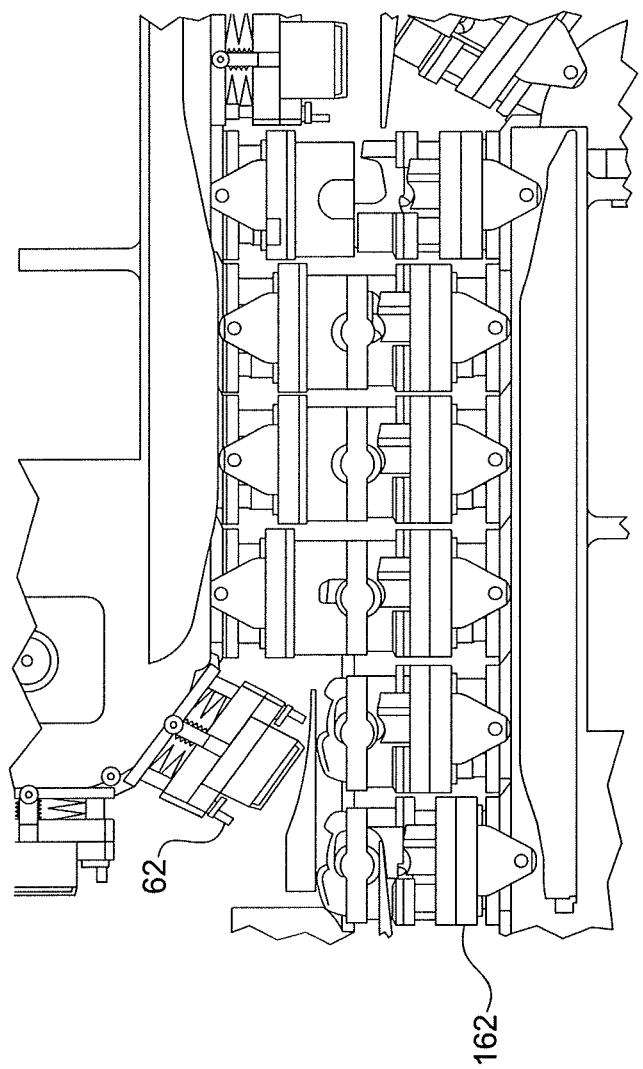
FIG. 23B shows the de-flash section of the machine illustrated in FIG. 22.
Figure 24C:
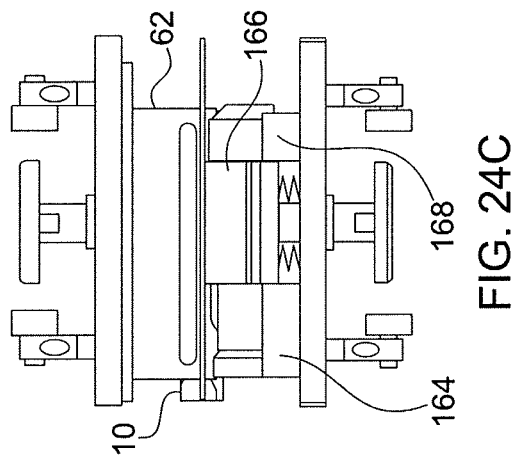
FIG. 24C shows the step of removing flash from a bottle using the stations during operation of the machine illustrated in FIG. 22.
Figure 24B:
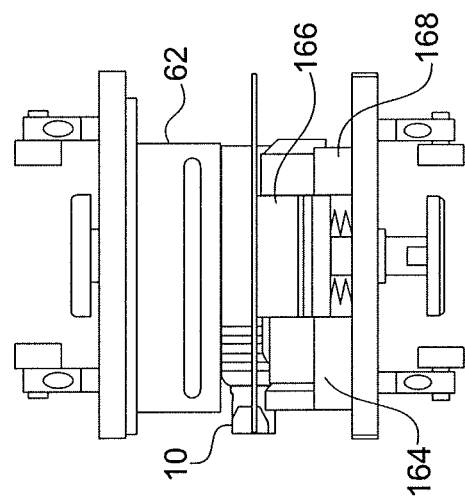
FIG. 24B shows the step of capturing a bottle by the stations during operation of the machine illustrated in FIG. 22.
Figure 24A:
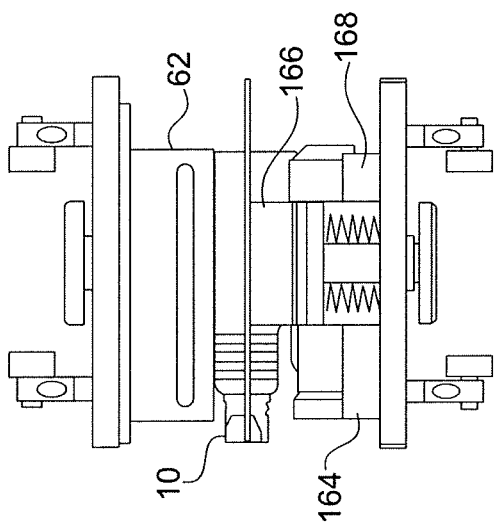
FIG. 24A shows the step of loading bottles into the stations during operation of the machine illustrated in FIG. 22.

The operation of the machine 100 is the same regardless of its vertical or horizontal orientation. First, the in-feed screw 32 delivers the bottle 10 to the nest station 162. FIG. 23A shows the in-feed section of the machine 100 illustrated in FIG. 22. FIG. 24A illustrates the step of loading bottles 10 into the stations 62, 162 during operation of the machine 100 illustrated in FIG. 22.

Figure 23C:
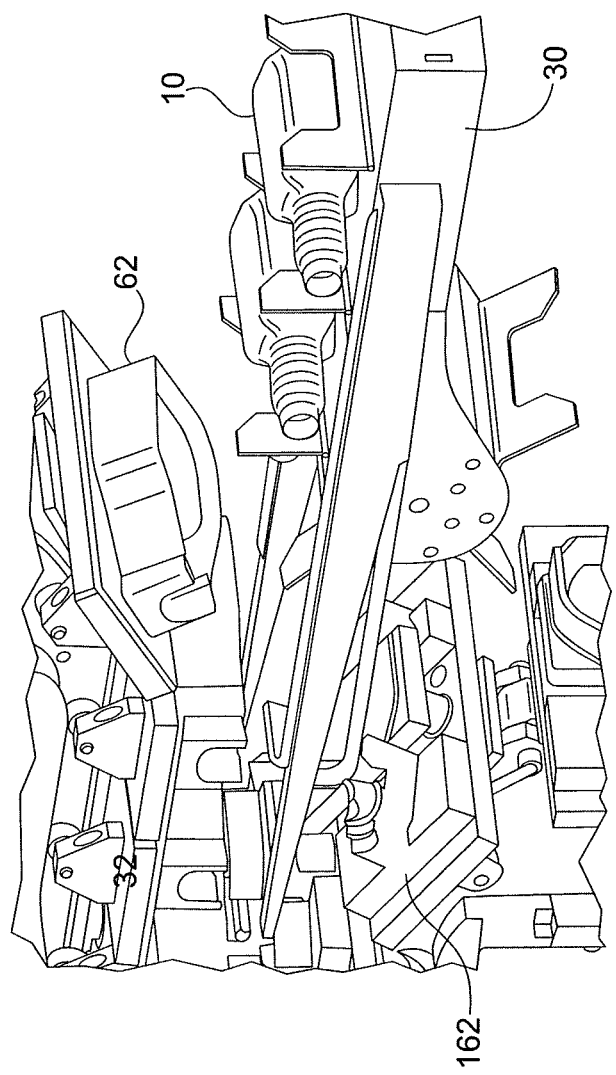
FIG. 23C shows the out-feed section of the machine illustrated in FIG. 22.

Next, cams move the bottle nests 116 on both turrets 60, 160 to capture the bottle 10. FIG. 23B shows the de-flash section of the machine 100 illustrated in FIG. 22. FIG. 24B shows the step of capturing the bottle 10 by the stations 62, 162 during operation of the machine 100 illustrated in FIG. 22. The cams then move the punch 106 of the punch station 62 across a part line to de-flash the bottle 10. FIG. 24C shows the step of removing flash 14 from the bottle 10 using the stations 62, 162 during operation of the machine 100 illustrated in FIG. 22. Finally, the cams retract the stations 62, 162 to release the de-flashed bottle 10 and the out-feed section of the machine 100 removes the de-flashed bottle 10 from the machine 100. FIG. 23C shows the out-feed section of the machine 100 illustrated in FIG. 22.

The major difference between the horizontal machine 100 and the vertical machine 100 is that, for the former, the nest station 162 is separated into three parts or portions to assist in the delivery of the bottle 10 from the in-feed screw 32 to the nest station 162. Thus, as illustrated in FIGS. 24A, 24B, and 24C, the nest station 162 has a first peripheral portion 164, a center portion 166, and a second peripheral portion 168. FIG. 24A illustrates the step of loading the bottles 10 into the nest station 162. During this step, the center portion 166 holds the bottle 10, the first peripheral portion 164 is located beneath the top 12 of the bottle 10, and the second peripheral portion 168 is located proximate the bottom of the bottle 10.

FIG. 24B shows the step of capturing the bottle 10 by the nest station 162. During this step, the stationary center portion 166 continues to hold the bottle 10, and cams move the first peripheral portion 164 and the second peripheral portion 168 upward relative to both the bottle 10 and the center portion 166. Thus, the top 12 of the bottle 10 is supported by the first peripheral portion 164 and the bottom of the bottle 10 is supported by the second peripheral portion 168. FIG. 24C shows the step of removing flash 14 from the bottle 10 by bringing the punch 106 of the punch station 62 into contact with the bottle 10 as the bottle 10 is held in the nest station 162.

Certain bottles 10 present challenges for a vertical machine 100. For example, the bottle 10 may have a high center of gravity, flash on its base preventing the bottle 10 from standing, flash wrapped around the bottle 10, or a combination of these characteristics. The horizontal machine 100 can remove flash 14 from the top 12 of the bottle 10 in each of these (and other) special cases. In addition, the horizontal machine 100 may offer higher line efficiencies by conveying the bottle 10 in a horizontal orientation.

Conventional de-flash apparatus, such as the Autotec Engineering and Uniloy Milacron apparatus described above, are unable to de-flash bottles presenting special cases—at least in a commercially practical way. The Autotec Engineering apparatus has a chain and buckets (or bottle nests) that index the bottle through the apparatus. Given the presence of the chain, the flash must be split into two parts before the flash can be removed from the apparatus. The task of splitting the flash into two is problematic because it creates the potential for the apparatus to damage the bottle. This task also adds another process step to the operation of the apparatus, which means slower throughput, and requires more components to keep up with the blow molder. The machine 100 of the invention eliminates these problems and costs about half the cost of the Autotec Engineering apparatus.

The Uniloy Milacron apparatus presents its own problems. Special-case bottles cannot be conveyed in the vertical orientation required of the Uniloy Milacron apparatus, for example, due to line speed limitations, flash on the bottom of the bottle, a high center of gravity, and a small footprint. As a result, operators cannot feed the bottles into the Uniloy Milacron apparatus at adequate production rates (with a commercially acceptable efficiency).

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods of using the machine 100 disclosed above are not restricted to any particular order.

What is claimed:

1. A continuous motion de-flash machine for removing flash from molded plastic articles, the machine comprising:
    a frame;
    an in-feed section supported by the frame and adapted to transport an article;
    a de-flash section supported by the frame, adapted to receive the articles from the in-feed section, and including (a) a de-flash turret with a plurality of cam-actuated punch stations each having a punch mounted to a back slide plate adapted to remove flash from the article, the punch stations traveling along an oval track with a pair of long straight portions connecting two curved portions, and (b) a nest turret with a plurality of nest stations, the nest stations traveling along an oval track parallel to the oval track of
    the punch station, wherein the de-flash turret is offset to the nest turret with respect to the direction the article is received by the de-flash section, and wherein the cam actuation of the punch stations results in the punch pushing toward a corresponding nest station relative to the back slide plate in a direction perpendicular to the oval track of the de-flash turret; and
    an out-feed section adapted to remove the article from the de-flash section and adapted to remove the article from the machine.

2. The machine according to claim 1 wherein the in-feed section has an in-feed screw adapted to receive articles and space the articles to the station pitch of the stations of the de-flash section.

3. The machine according to claim 2 wherein the in-feed section has a conveyor adapted to transport articles longitudinally and in an upright manner to the in-feed screw.

4. The machine according to claim 1 wherein the punch removes the flash from the article while the article is nested in the nest station and the punch station as the nest station and the punch station travel along the long, straight, parallel portions of their respective oval tracks.

5. The machine according to claim 1 wherein the punch completes a horizontal path of motion perpendicular to the direction the article travels through the de-flash section to remove the flash.

6. The machine according to claim 1 further comprising a carriage slide assembly for positioning the de-flash turret and the nest turret.

7. The machine according to claim 6 further comprising a jack assembly raising and lowering the carriage slide assembly and the de-flash turret and the nest turret for adjusting the machine to various article heights.

8. The machine according to claim 1 further comprising a magnet attached to each of the de-flash turret and the nest turret and a linear variable differential transformer located underneath each turret, the linear variable differential transformers using the magnets to detect the position of each turret.

9. The machine according to claim 1 further comprising an encoder installed on both the de-flash turret and the nest turret to monitor the speed and position of the punch stations and the nest stations.

10. The machine according to claim 1 further comprising an electrical cabinet housing connections to an external source of electrical power and controlling those connections.

11. The machine according to claim 1 further comprising a human-machine interface adapted to provide an interface between the machine and a human being operating the machine.

12. The machine according to claim 1 further comprising guards enclosing the perimeter of the machine, extending to a height sufficient to prevent an operator from accessing the various components of the machine, and including a plurality of doors that, when the machine is stopped and one or more of the doors is or are opened, provide access to the various components of the machine by the operator.

13. The machine according to claim 1 wherein the de-flash section of the machine has a removal chute to remove the flash, after having been removed from the article, from the machine.

14. A continuous motion de-flash machine for removing flash from molded plastic articles, the machine comprising:
    a frame;
    an in-feed section being supported by the frame and having
        (a) an in-feed screw adapted to receive articles and space the articles to a predetermined station pitch, and (b) a conveyor transporting articles to the in-feed screw;
    a de-flash section supported by the frame, receiving articles from the in-feed section, and including:
        (a) a de-flash turret with a plurality of cam-actuated punch stations each having a punch adapted to remove flash from an article upon completion of a horizon path of motion perpendicular to the direction the article travels through the de-flash section to remove the flash, the punch stations traveling along an oval track with a pair of long straight portions connecting two curved portions,
        (b) a nest turret with a plurality of cam-actuated nest stations, the nest stations traveling along an oval track parallel to the oval track of the punch stations, wherein the punch removes the flash from the article while the article is nested in the nest station and the punch station as the nest station and the punch station travel along the long, straight, parallel portions of their respective oval tracks, wherein the de-flash turret is offset to the nest turret with respect to the direction the article is received by the de-flash section, and
        (c) a removal chute to remove the flash, after having been removed from the article, from the machine;
    a carriage slide assembly for positioning the de-flash turret and the nest turret;
    an encoder installed on both the de-flash turret and the nest turret to monitor the speed and position of the punch stations and the nest stations;
    an electrical cabinet housing connections to an external source of electrical power and controlling those connections;
    a human-machine interface adapted to provide an interface between the machine and a human being operating the machine;
    guards enclosing the perimeter of the machine, extending to a height sufficient to prevent an operator from accessing the various components of the machine, and including a plurality of doors that, when the machine is stopped and one or more of the doors is or are opened, provide access to the various components of the machine by the operator; and
    an out-feed section receiving an article from the de-flash section and removing the article from the machine.

15. The machine according to claim 14 further comprising a jack assembly raising and lowering the carriage slide assembly and the de-flash turret and the nest turret for adjusting the machine to various article heights.

16. The machine according to claim 14 further comprising a magnet attached to each of the de-flash turret and the nest turret and a linear variable differential transformer located underneath each turret, the linear variable differential transformers using the magnets to detect the position of each turret.

17. A method of de-flashing articles having unwanted flash, the method comprising:
    providing articles to a de-flash machine, the de-flash machine having (a) a de-flash turret with a plurality of punch stations each having a punch mounted to a back slide plate adapted to remove flash from an article, the punch stations traveling along an oval track with a pair of long straight portions connecting two curved portions, and (b) a nest turret with a plurality of nest stations, the nest stations traveling along an oval track parallel to the oval track of the punch stations, wherein the de-flash turret is offset to the nest turret with respect to the direction the article is received by the de-flash section;
    pulling a punch station and a corresponding nest station into their open positions;
    delivering an article to the punch station and the nest station while the punch station and the nest station are in their open positions;
    closing the punch station and the nest station together, wherein the nest station aligns with the punch station along the straight portion of the parallel oval tracks along which the nest station and the punch station travel, thereby capturing the article;
    directing the punch across the article to remove the flash from the article, wherein the punch moves across the article in a direction perpendicular to the straight portion of the parallel oval tracks;
    retracting the punch into the punch station;
    moving the punch station and the nest station away from each other into an open position; and
    releasing the de-flashed article.

18. The method according to claim 17 further comprising the initial step of spacing the articles to the station pitch of the stations of the de-flash machine using an in-feed screw.

19. The method according to claim 17 wherein the movements of the punch station and the nest station are controlled using cams.

20. The method according to claim 17 further comprising the final step of transporting the article out of the machine.

* * * * *

UNITED STATES PATENT AND TRADEMARK OFFICE
CERTIFICATE OF CORRECTION

PATENT NO. : 8,881,629 B2  
APPLICATION NO. : 13/494201  
DATED : November 11, 2014  
INVENTOR(S) : Pennington It is certified that error appears in the above-identified patent and that said Letters Patent is hereby corrected as shown below:

In the claims,

Column 16, Line 37 should read:

receive the article from the in-feed section, and includ-

Column 17, Line 52 should read:

flash from an article upon completion of a horizontal

Signed and Sealed this  
Fifth Day of May, 2015

Michelle K. Lee  
*Director of the United States Patent and Trademark Office*